(12) United States Patent
Hansen

(10) Patent No.: US 10,283,223 B2
(45) Date of Patent: May 7, 2019

(54) MOLTEN SALT REACTOR THAT INCLUDES MULTIPLE FUEL WEDGES THAT DEFINE FUEL CHANNELS

(71) Applicant: UTAH GREEN ENERGY TECHNOLOGIES, LLC, Highland, UT (US)

(72) Inventor: M. Sheldon Hansen, Orem, UT (US)

(73) Assignee: Utah Green Energy Technologies, LLC, Highland, UT (US)

( * ) Notice: Subject to any disclaimer, the term of this patent is extended or adjusted under 35 U.S.C. 154(b) by 624 days.

(21) Appl. No.: 14/859,100

(22) Filed: Sep. 18, 2015

(65) Prior Publication Data
US 2017/0084354 A1 Mar. 23, 2017

(51) Int. Cl.
| | | |
|---|---|---|
| *G21C 1/14* | (2006.01) | |
| *G21C 1/16* | (2006.01) | |
| *G21C 1/22* | (2006.01) | |
| *G21C 5/02* | (2006.01) | |
| *G21C 19/14* | (2006.01) | |
| *G21C 19/19* | (2006.01) | |
| *G21C 11/06* | (2006.01) | |
| *G21C 5/12* | (2006.01) | |
| *G21D 9/00* | (2006.01) | |

(52) U.S. Cl.
CPC ............. *G21C 1/16* (2013.01); *G21C 1/22* (2013.01); *G21C 5/02* (2013.01); *G21C 19/14* (2013.01); *G21C 19/19* (2013.01); *G21C 5/126* (2013.01); *G21C 11/06* (2013.01); *G21D 9/00* (2013.01); *Y02E 30/40* (2013.01)

(58) Field of Classification Search
CPC . G21C 1/16; G21C 1/22; G21C 19/14; G21C 19/19; G21C 5/02; G21C 11/06; G21C 5/126; G21C 3/54; G21D 9/00
USPC .................................................. 376/360, 366
See application file for complete search history.

(56) References Cited

U.S. PATENT DOCUMENTS

| | | | | |
|---|---|---|---|---|
| 2,940,915 A | * | 6/1960 | Hammond ............. | G21C 19/24 376/459 |
| 3,251,745 A | * | 5/1966 | Teitel ....................... | G21C 1/22 376/359 |
| 10,008,293 B2 | | 6/2018 | Hansen | |
| | | (Continued) | | |

OTHER PUBLICATIONS

Unknown, "Molten-Salt Reactor Experiment", Wikipedia Online Encyclopedia, Downloaded Mar. 22, 2017, pp. 1-5.

(Continued)

*Primary Examiner* — Jack W Keith
*Assistant Examiner* — Daniel Wasil
(74) *Attorney, Agent, or Firm* — David B. Tingey; Bryant J. Keller; Kirton McConkie

(57) ABSTRACT

Systems and methods for providing a molten salt reactor can include a graphite reactor core that defines an internal space, with multiple fuel wedges being received in the internal space, and with the wedges each defining a fuel channel extending from a first end to a second end of each of the wedges. The reactor can further include a fuel pin rod that defines an internal fuel conduit and that is disposed between at least two of the wedges. The reactor core can also define a fuel ingress port and a fuel egress port. The reactor core can further be rotatably received within a reactor housing such that the ports are configured to become at least one of more occluded and less occluded as the reactor core rotates.

14 Claims, 36 Drawing Sheets

(56) References Cited

U.S. PATENT DOCUMENTS

| | | |
|---|---|---|
| 2007/0064861 A1 | 3/2007 | Sterbentz |
| 2009/0252277 A1 | 10/2009 | Kim et al. |
| 2013/0083878 A1* | 4/2013 | Massie ................ G21C 1/22 |
| | | 376/359 |
| 2015/0036779 A1 | 2/2015 | Leblanc |
| 2015/0228363 A1 | 8/2015 | Dewan et al. |
| 2017/0084354 A1 | 3/2017 | Hansen |
| 2017/0330639 A1 | 11/2017 | Hansen |
| 2017/0330640 A1 | 11/2017 | Hansen |

OTHER PUBLICATIONS

Sorensen, Kirk, "Classic ORNL MSRE Film", Thorium Online blog (http://energyfromthorium.com), Oct. 16, 2016, pp. 1-8.

* cited by examiner

SECTION B-B          FIG. 2A

SECTION B-B

SECTION B-B

SECTION C-C

SECTION A-A

SECTION D-D

SECTION E-E

SECTION F-F

SECTION H-H

SECTION J-J

ମOLTEN SALT REACTOR THAT INCLUDES
MULTIPLE FUEL WEDGES THAT DEFINE
FUEL CHANNELS

BACKGROUND OF THE INVENTION

Field of the Invention

The present invention relates to molten salt reactors. More particularly, some implementations of the described invention relate to systems and methods for providing a thorium molten salt reactor. In this regard, some implementations of the reactor are configured to rotate a reactor core to vary a flow rate of fissionable fuel through the reactor. Moreover, in some implementations, the reactor core houses two or more fuel wedges that each define at least one fuel channel that extends through the wedges. In some implementations, one or more of the wedges, components of the reactor core, and/or reflectors surrounding the core are configured to be replaced relatively easily.

Background and Related Art

The need for electrical energy across the world appears to be ever growing. In this regard, electricity for power grids across the world is generated through a wide variety of methods. In one example, coal, natural gas, petroleum, another fossil fuel, wood, waste, and/or one or more other fuel sources are burned to create heat, which is then used to turn a turbine (e.g., via pressure applied to the turbine by steam that is created, and/or air that is expanded, by the heat) and ultimately to turn an electrical generator.

In another example, wind or water is used to create electricity as such media move past (or otherwise interact with) a generator. For instance, water passing through a hydroelectric dam, water passing a water wheel, air passing a wind turbine, and tidal water passing a tidal energy converter have each been found to be effective methods for generating electricity.

In still other examples, sunlight (e.g., via solar cells, solar thermal energy generators) and/or geothermal energy (e.g., via vapor-dominated reservoirs, liquid-dominated reservoirs, enhanced geothermal systems, geothermal heat pumps, etc.) are used to generate electricity. Moreover, in another example, nuclear energy is used to generate electricity. In this regard, uranium or another fissionable material is typically used to generate heat that converts water to steam, which, in turn, rotates one or more turbines that are coupled to one or more electric generators.

Although many conventional methods for generating electricity have proven to be very useful, such methods are not necessarily without their shortcomings. For instance, some methods that generate electricity by burning fossil fuels, also produce relatively large amounts of pollution and carbon dioxide gas, while depleting the Earth's limited natural resources. Additionally, some methods for generating electricity via solar-power and/or wind-power systems are only able to generate electricity when they are exposed to a sufficient amount of sunlight and/or wind—factors that are not necessarily available 24 hours a day and 365 days a year. Moreover, as some geothermal and hydroelectric power systems rely upon, and are limited by, the natural conditions on which such systems rely, many such systems are optimally (and sometimes only) placed in specific locations (e.g., at tectonic plate boundaries, rivers, reservoirs, coast lines, etc.) that have the requisite conditions. Furthermore, some nuclear power plants also have shortcomings, which can include potential environmental damage associated with potential meltdowns, accident, uranium mining, and nuclear waste generated by the power plants.

Thus, while systems and methods currently exist that are used to generate electricity, challenges still exist, including those listed above. Accordingly, it would be an improvement in the art to augment or even replace current techniques with other techniques.

SUMMARY OF THE INVENTION

The present invention relates to molten salt reactors. More particularly, some implementations of the described invention relate to systems and methods for providing a thorium molten salt reactor. In this regard, some implementations of the reactor are configured to rotate a reactor core to vary a flow rate of fissionable fuel through the reactor. Moreover, in some implementations, the reactor core houses two or more fuel wedges that each define at least one fuel channel that extends through the wedges. In some implementations, one or more of the wedges, components of the reactor core, and/or reflectors surrounding the core are configured to be replaced relatively easily.

Some implementations include a molten salt reactor that includes a reactor core comprising graphite (e.g., a substantially pure and/or other suitable graphite) and defining an internal space containing multiple fuel wedges that each define a fuel channel that is configured to allow a thermonuclear or fissionable fuel to flow from a first end to a second end of each of the wedges.

Some implementations further include a molten salt reactor that includes a reactor core that is disposed in a reactor housing and that comprises graphite and defines multiple fuel channels that run between a first end and a second end of the reactor core. In some cases, the reactor core comprises one or more fuel ingress ports (or inlets) and egress ports (or outlets), and the reactor core is rotatably received within the reactor housing such that the fuel ingress and egress ports are configured to become at least one or more occluded and less occluded as the reactor core rotates within the housing.

Additionally, some implementations include a molten salt reactor that includes a reactor core that is disposed in a reactor housing and that comprises graphite and defines an internal space with multiple fuel wedges being received within the internal space, wherein the fuel wedges each define a fuel channel that is configured to allow a fissionable fuel to flow from a first end to a second end of each of the wedges. In some cases, a fuel pin rod is disposed between at least two of the wedges, with the fuel pin rod defining an internal fuel conduit. Additionally, in some cases, the reactor core further comprises a fuel ingress port and a fuel egress port, and the reactor core is rotatably received within the reactor housing such that the fuel ingress and egress ports are configured to become at least one of (i) more occluded and (ii) less occluded as the reactor core rotates within the housing.

While the methods and processes of the present invention may be particularly useful for generation of electricity, those skilled in the art will appreciate that the described systems and methods can be used in a variety of different applications and in a variety of different areas of manufacture. For instance, instead of comprising a generator, some implementations of the described systems and methods are configured to provide heat to one or more buildings, stadiums, neighborhoods, and/or other structures and facilities.

In some other cases, the described systems are configured for desalination and/or to distill water (e.g., to create drinking (or relatively clean) water from salt water or another non-potable and/or polluted water source). In still other cases, the described systems and methods are configured to provide energy for use in" oil shale and oil sand production, molten pool thermal electric sterling motors, onshore and offshore power plants, automobiles, trains, ships, submarines, airplanes, helicopters, space shuttles, off-planet applications (e.g., on the moon), the production of hydrogen fuels, the production of bio gas applications, in locations where portable power stations are useful (e.g., by attaching the molten salt reactor to a trailer, a skid, a vehicle, etc.), providing geothermal liquid enhancers, heating water for aqua culture, and/or for a wide variety of other suitable purposes.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings are not necessarily drawn to scale or in proper proportion, and that the drawings depict only typical embodiments of the present invention and are not, therefore, to be considered as limiting the scope of the invention, the present invention will be described and explained with additional specificity and detail through the use of the accompanying drawings in which:

FIG. 2A illustrates a cross-sectional view of a reactor core housing, in accordance with a representative embodiment;

DETAILED DESCRIPTION OF THE INVENTION

The present invention relates to molten salt reactors. More particularly, some implementations of the described invention relate to systems and methods for providing a thorium molten salt reactor. In this regard, some implementations of the reactor are configured to rotate a reactor core to vary a flow rate of fissionable fuel through the reactor. Moreover, in some implementations, the reactor core houses two or more fuel wedges that each define at least one fuel channel that extends through the wedges. In some implementations, one or more of the wedges, components of the reactor core, and/or reflectors surrounding the core are configured to be replaced relatively easily.

The following disclosure is grouped into two subheadings, namely "MOLTEN SALT REACTOR" and "REPRESENTATIVE OPERATING ENVIRONMENT." The utilization of the subheadings is for convenience of the reader only and is not to be construed as being limiting in any sense.

Molten Salt Reactor

Figure 1A:
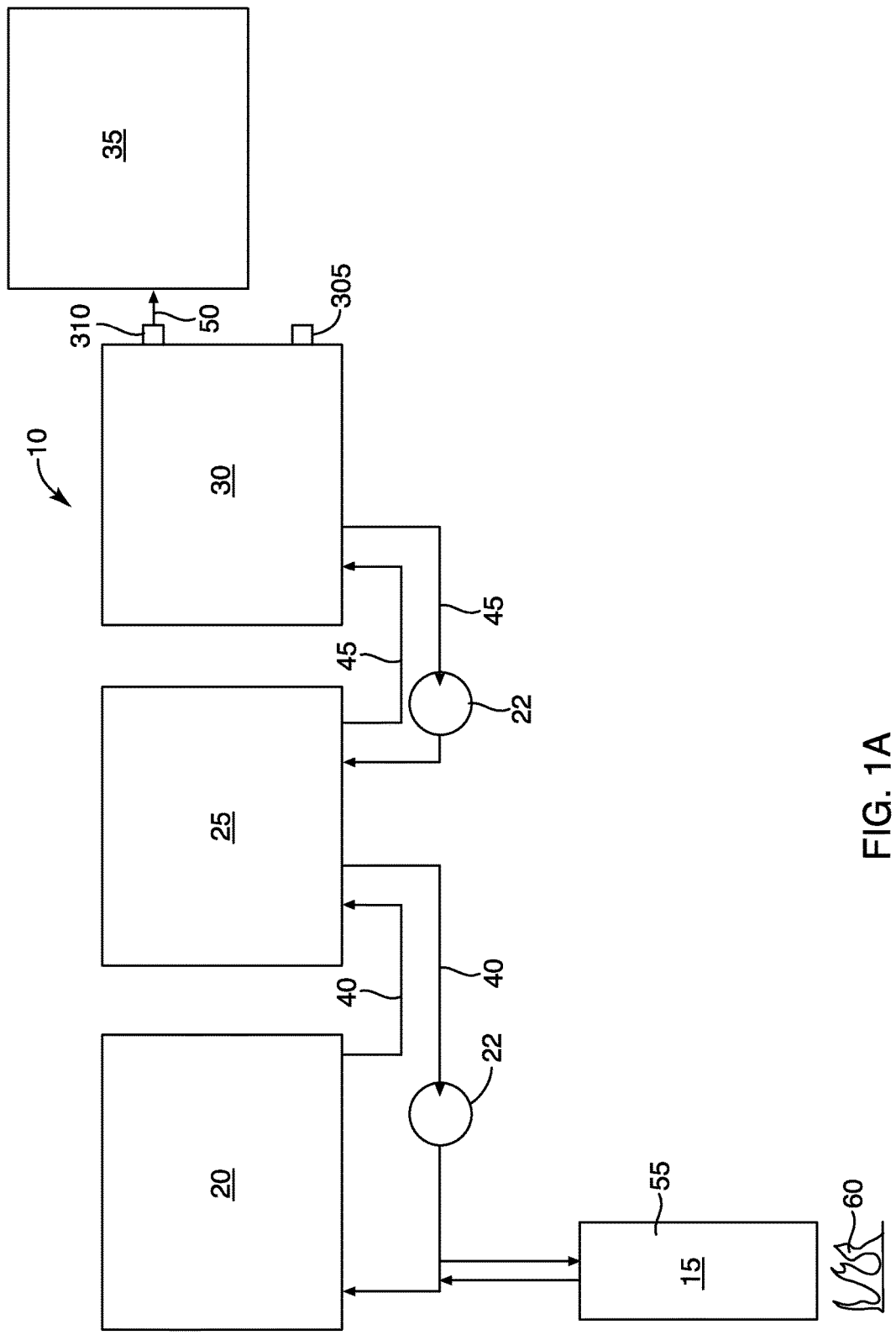
FIG. 1A illustrates a block diagram of a molten salt reactor system, in accordance with a representative embodiment of the invention.
Figure 1B:
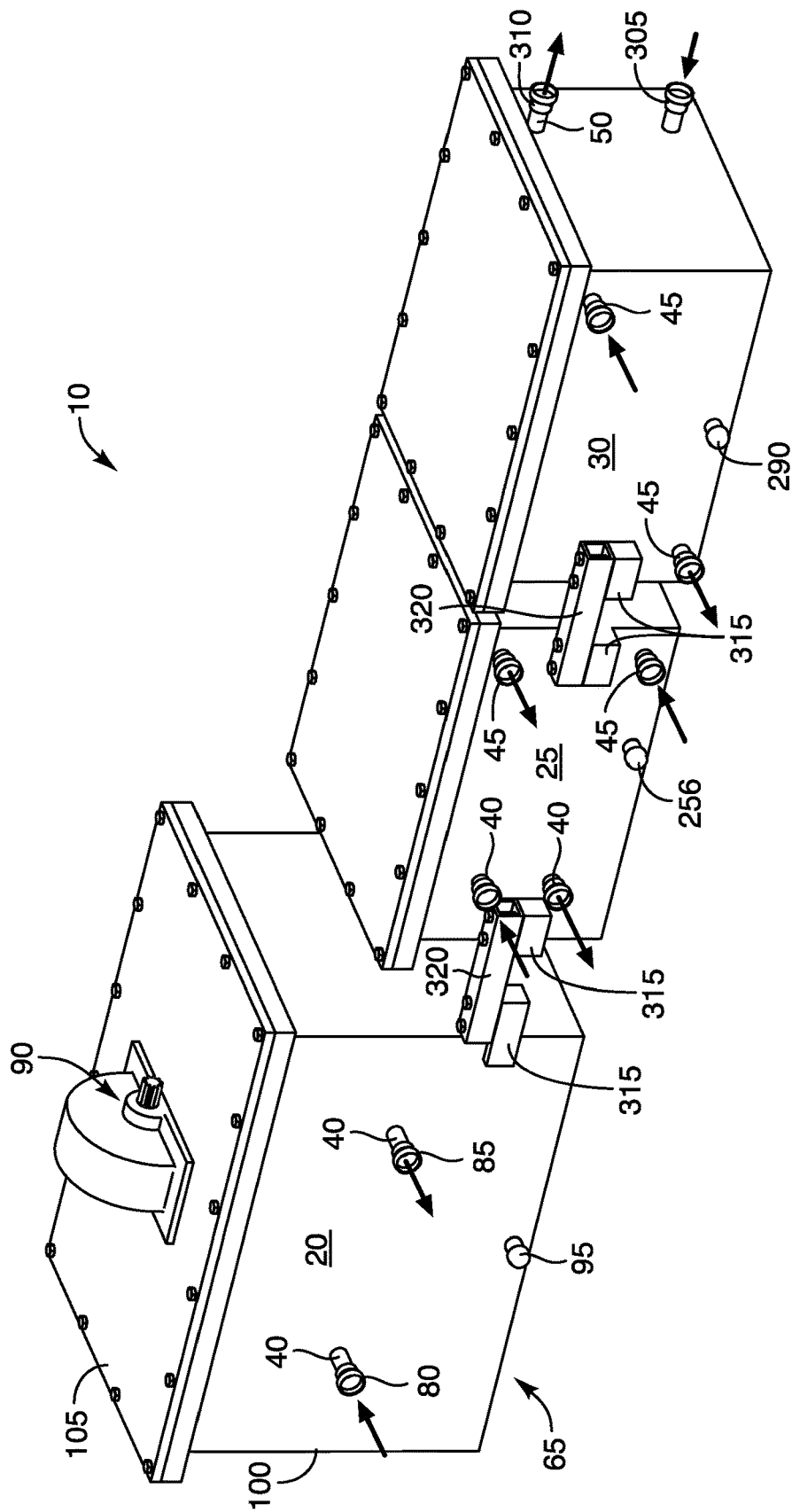
FIG. 1B illustrates a perspective view of the molten salt reactor system, in accordance with a representative embodiment.
Figure 1C:
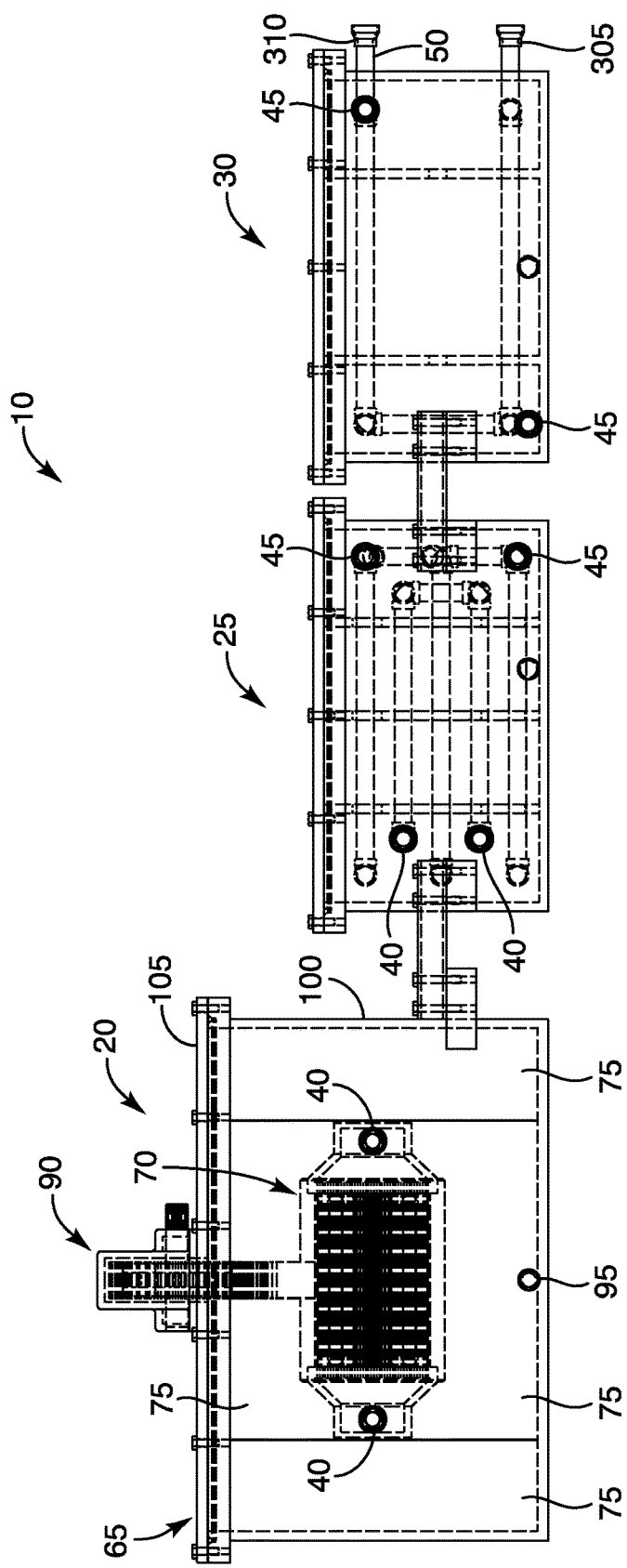
FIG. 1C illustrates a schematic view of the molten salt reactor system, in accordance with a representative embodiment.

While the described systems can comprise any suitable component, FIG. 1A shows a representative embodiment in which the described molten salt reactor system 10 comprises one or more heaters 15, reactors 20, heat exchangers 25, steam generators 30, and/or electric generators 35. Additionally, while the described systems can function in any suitable manner, FIGS. 1A-1C show that, in some embodiments, the heater 15 (not shown in FIGS. 1B-1C) is configured to heat one or more fissionable fuel sources (not shown) and/or carrier mediums (not shown) (collectively, the "fuel") into a molten state and to pass the molten fuel to the reactor 20. In some embodiments, the reactor 20 is configured to function as a neutron moderator that is designed to reduce the speed of fast neutrons in the molten fuel and to convert such neutrons into thermal neutrons that allow the fuel to sustain a nuclear chain reaction (or to be in a critical state), which further heats the fuel.

In accordance with some embodiments, FIGS. 1A-1C show that heated fuel (not shown) is cycled in a first fluid line 40 between the heat exchanger 25 and the reactor 20 such that as the fuel passes through the heat exchanger, heat from the heated fuel is passed to a heat transfer medium (not shown) running through a second fluid line 45 that is separate from the first fluid line. In some embodiments (as shown in FIGS. 1A-1C), the second fluid line 45 extends between the heat exchanger 25 and the steam generator 30.

In some such embodiments, the system is configured move the heat transfer medium from the heat exchanger 25 (where the medium is heated), through the steam generator 30 (where heat from the heat transfer medium causes water in the steam generator to turn into steam), and the heat transfer medium is then returned to the heat exchanger (where the transfer medium is reheated). In accordance with some embodiments, FIG. 1A shows that steam from the steam generator 30 is optionally directed to the electric generator 35 (e.g., via a third line 50 or otherwise), where the steam is used to turn one or more turbines to generate electricity.

To provide a better understanding of the described system 10, each of the aforementioned components of the system is described below in more detail.

With respect to the heater 15, the heater can comprise any suitable component that allows it to heat the fissionable fuel to a molten state and to then pass the molten fuel to the reactor 20. Indeed, in accordance with some embodiments, FIG. 1A shows the heater comprises a container 55, which is configured to hold the fuel, and a heat source 60 that is configured to heat the fuel.

The container 55 can have any suitable characteristic that allows the heater 15 to function as intended. For instance, the container can: be any suitable size (e.g., hold a volume of fuel that is larger than, smaller than, and/or approximately equal in volume to an internal volume of a reactor core in the reactor 20), be made of any suitable materials (e.g., comprise one or more nickel alloys, low-chromium nickel-molybdenum alloys (such as HASTELLOY-N™), metals, cements, ceramics, synthetic materials, and/or any other suitable materials), and have any suitable component (e.g., one or more drains that are configured to drain molten fuel to the reactor and/or another container, pumps that are configured to force the fuel to the reactor and/or another suitable container, mixers that are configured mix various components of the fissionable fuel, vents, valves, lids, seals, thermostats, sensors, fans, and/or other suitable components) that allow the heater to function as intended. Indeed, in some embodiments, the container comprises one or more agitators, shakers, orbital mixers, and/or other mixers that are capable of mixing the various components of the fuel as it is cracked.

With regards to the heat source 60, the heat source can comprise any suitable heat source that is capable of converting (or cracking) one or more components of the fuel to a molten state. Some examples of suitable heat sources include, but are not limited to, one or more burners, heating coils, heating elements, ovens, fires, solar heaters, and/or other suitable heat sources that are capable of liquefying the fuel. The heat source may also use any suitable energy source to heat the container 55 to a desired temperature. Some non-limiting examples of such energy sources include fossil fuels, coal, electricity, wood, biomass, biofuel, and/or any other suitable source.

Once the fuel has been cracked, the fuel can be moved from the heater 15 to the reactor 20 in any suitable manner. In one example, the fuel is pumped (e.g., via one or more pumps 22, as shown in FIG. 1A) from the heater 15 to the reactor 20. In another example, the fuel is allowed to drain into the reactor via gravity. In still another example, a reactor core comprises a vacuum that is configured to draw the fuel into the core (e.g., once a valve is opened).

In some embodiments, once the heater 15 has cracked the fuel and the fuel has gone critical in the reactor 20, the heater is no longer needed to maintain the fuel in a molten state. Accordingly, while the heater 15 can have any suitable relationship with the reactor 20, in some embodiments, once the fuel has been cracked by the heater and been introduced into the reactor, the heater is disconnected from the reactor, a valve between the heater and the reactor is closed, and/or the system 10 is otherwise modified such that fuel in the reactor does not flow back into the heater until desired. Thus, in some embodiments, the heater is simply used to start and to restart the system (e.g., when the system is started for the first time and/or after the system has been shut down for maintenance and/or any other reason).

With respect to the fuel, the fuel can comprise any suitable ingredient or ingredients that allow the fuel to be heated into a molten state and to go critical in the reactor 20. Indeed, as mentioned above, in some embodiments, the fuel comprises a fissionable fuel source and a carrier medium. Some examples of suitable fissionable fuel sources include, but are not limited to, U-233, thorium U-232, U-235, Th-232, Th-228, Th-230, Th-234, nuclear waste from a nuclear reactor (e.g., one or more light water, and/or other nuclear reactors), fuel un-cladded nuclear spent fuel rods, nuclear spent fuel rod pellets, Pu-239, $UF_4$-LiF, $PuF_3$, and/or any other suitable fissionable material and/or precursor to a suitable fissionable material. Indeed, in some embodiments, the fissionable fuel source comprises U-232, U-233, and U-235. Additionally, in some embodiments, the fuel comprises one or more other atomic elements that are configured to be mixed (e.g., homogeneously or otherwise) into the fuel.

The various components of the fissionable fuel source can be present in the fuel at any suitable concentrations. Indeed, in some embodiments in which the fuel comprises U-232 and U-233, the two components are respectively used at a molar ratio between about 100:1 and 1:100, or at any suitable subrange thereof. Indeed, in some embodiments, when the fuel is initially added to the reactor, the fuel respectively comprises U-232 and U-233 at a molar ratio between about 6:1 and about 2:1 (e.g., at a ratio of about 4:1) (though other materials (e.g., atomic elements and/or other suitable materials) can also be mixed therein).

Figure 2B:
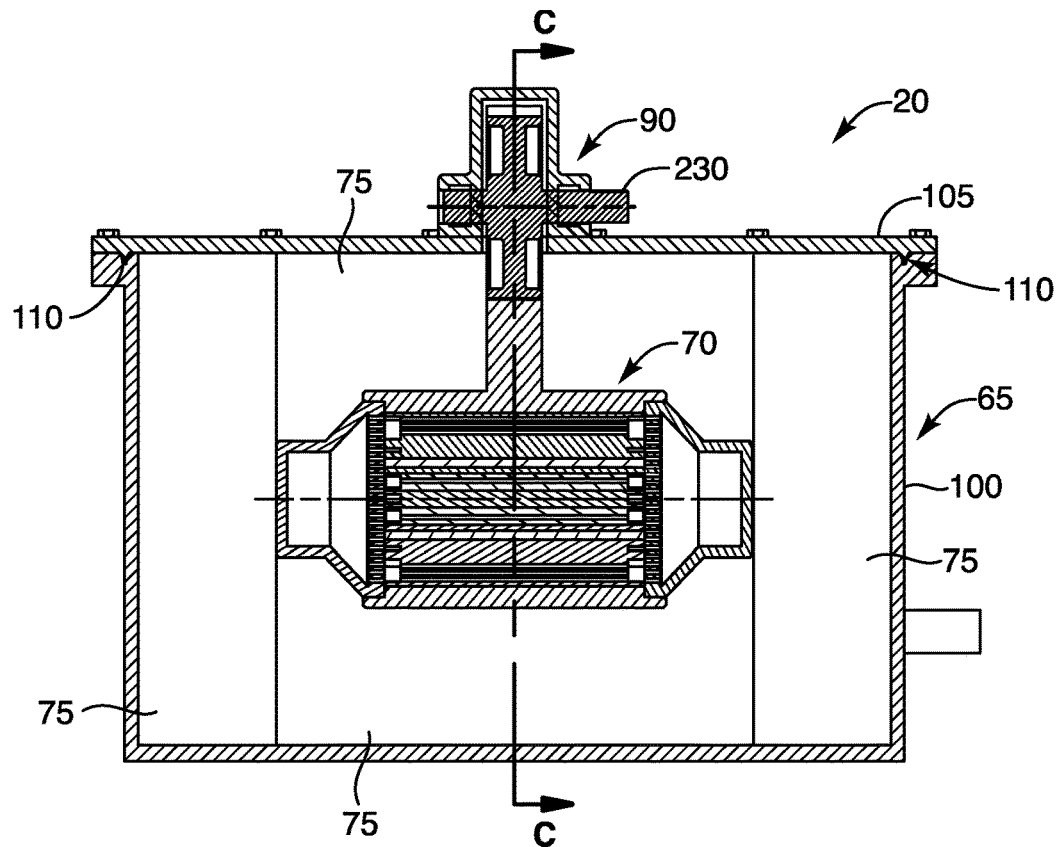
FIG. 2B illustrates a top schematic view of the reactor core housing in a partially assembled representative embodiment.
Figure 2B:
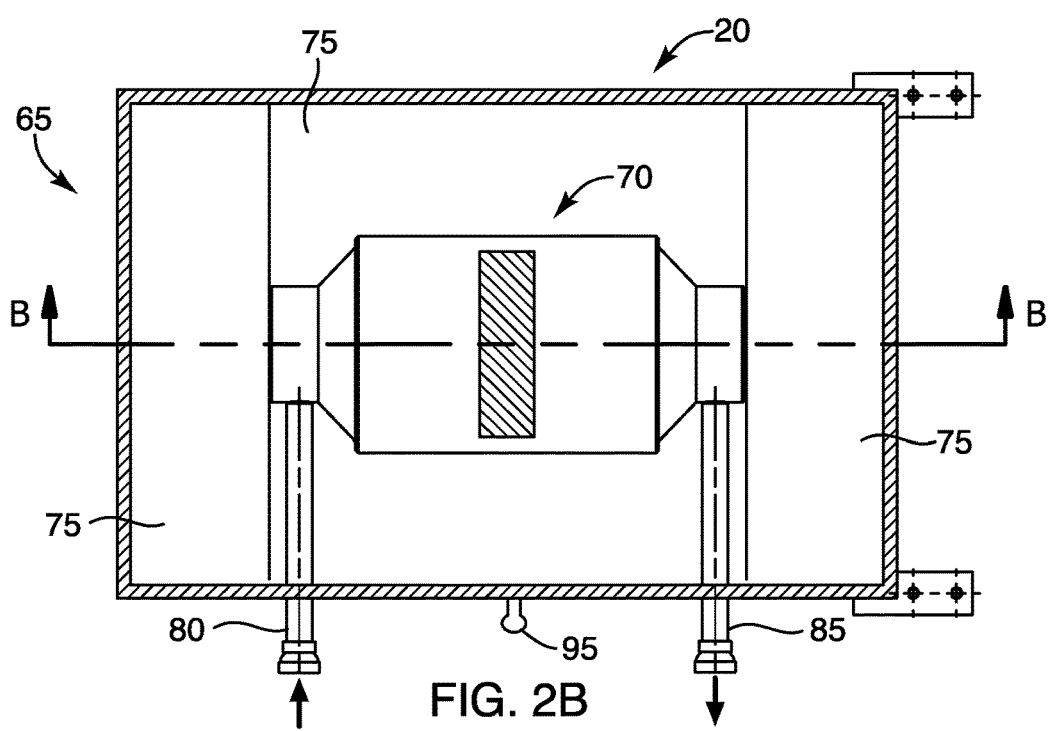

With respect to the carrier medium, the fuel can comprise any suitable carrier medium that allows the fuel to go critical in, and that is safe for use with, the reactor 20. Some examples of such carrier mediums include, but are not limited to, $KNO_3$ (potassium nitrate), $NaNO_3$ (sodium nitrate), $ThF_4$ (thorium fluoride), LiF (lithium fluoride), $BeF_2$ (beryllium fluoride), FLiBe (a molten mixture of lithium fluoride and beryllium fluoride), FLiNaK (a metal salt mixture of LiF, NaF (sodium fluoride), and KF (potassium fluoride)), and/or any other suitable salt or salts. Indeed, in some embodiments, the carrier medium comprises potassium nitrate and/or sodium nitrate. In some other embodiments, the carrier medium comprises potassium fluoride and/or sodium fluoride along with one or more other high thermal salts that can become a homogenous atomic element blend in the fuel.

Where the carrier medium comprises more than one ingredient, the various ingredients can be present at any suitable concentration in the fuel. Indeed, in some embodiments, the two components (e.g., potassium nitrate and sodium nitrate, potassium fluoride and sodium fluoride, etc.) are respectively used at a molar ratio between about 100:1 and 1:100, or at any suitable subrange thereof. In this regard, in some embodiments, the carrier medium respectively comprises potassium nitrate and sodium nitrate at a molar ratio between about 6:1 and about 0.5:1 (e.g., at a ratio of about 1.5:1). In some embodiments, the fuel includes a mixer of 60% potassium nitrate to 40% sodium nitrate, along with one or more other homogenous salt blends Turning now to the reactor 20, the reactor can comprise any suitable component and characteristic that allows the fuel to obtain and/or sustain a nuclear chain reaction by passing through the reactor. By way of non-limiting illustration, FIGS. 2A-2B show that, in some embodiments, the reactor 20 comprises one or more housings 65, reactor cores 70, reflectors 75, fuel inlets 80, fuel outlets 85, reactor control mechanisms 90, and/or drains 95.

Figure 2C:
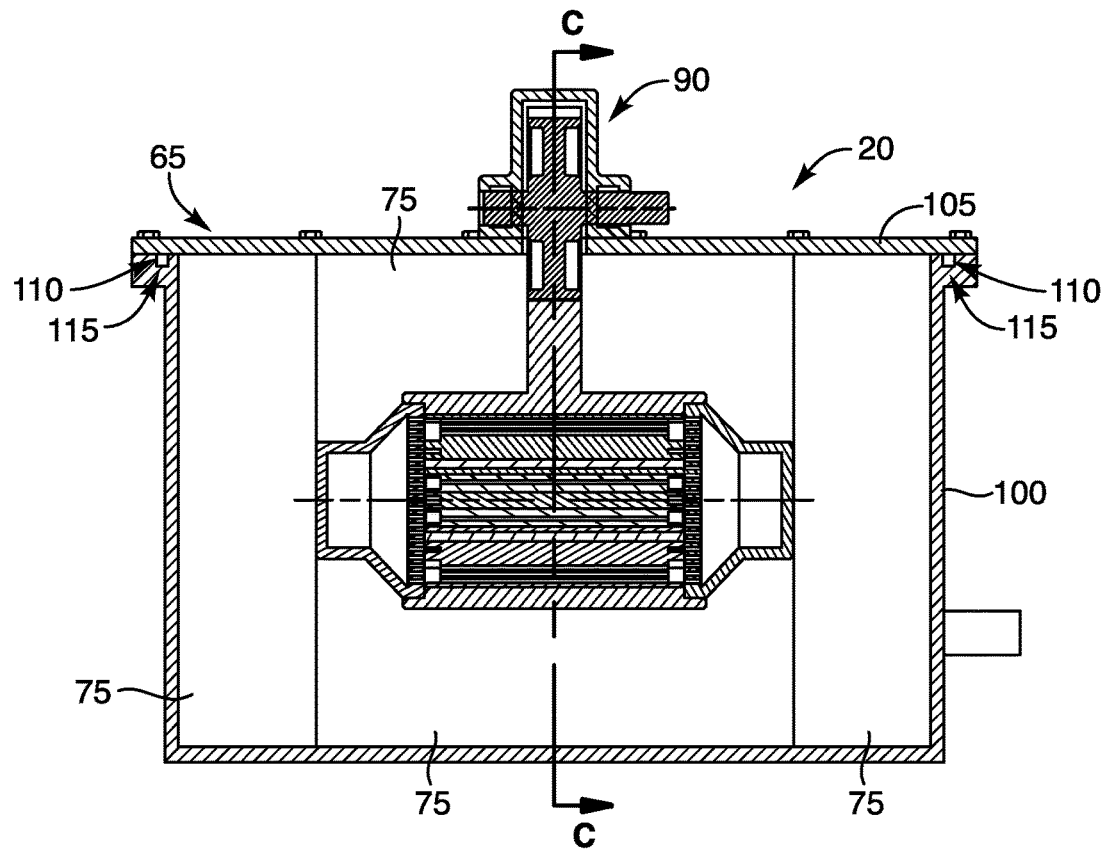
FIG. 2C illustrates a cross-sectional view of the reactor core housing, in accordance with a representative embodiment.
Figure 3A:
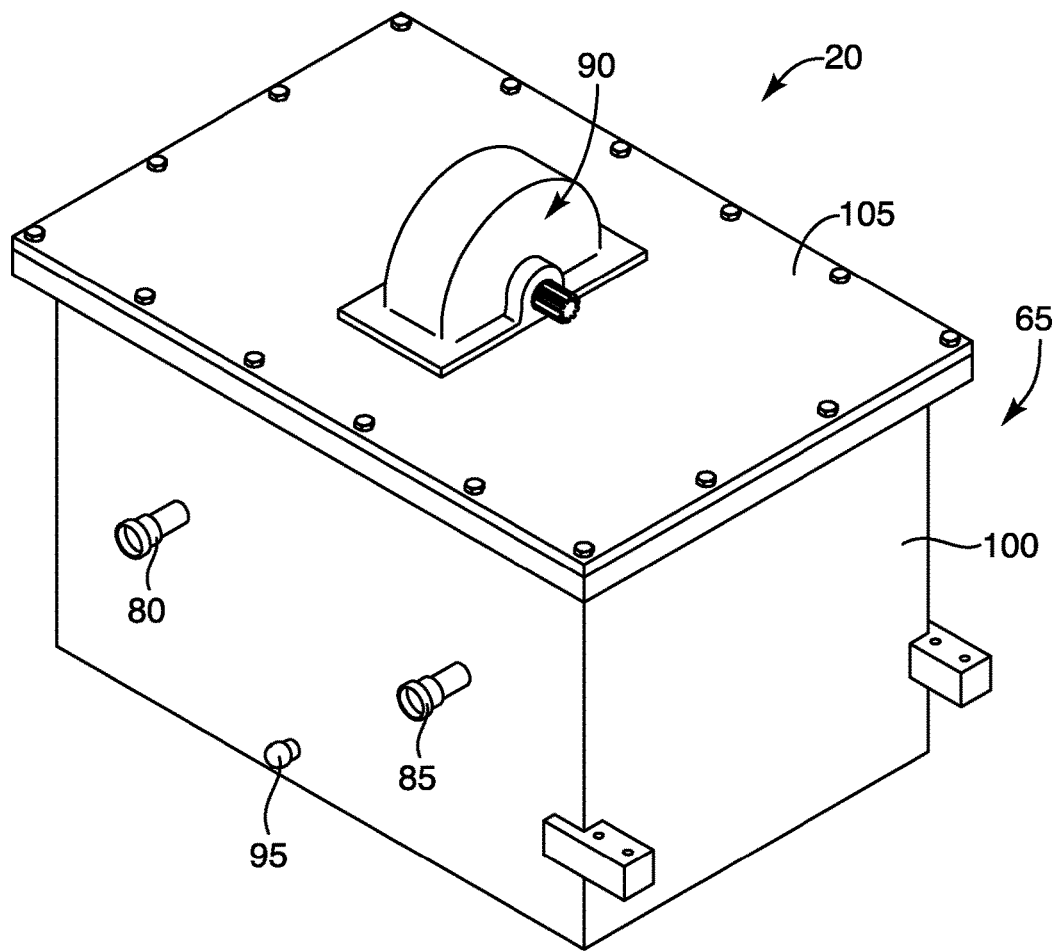
FIG. 3A illustrates a perspective view of a representative embodiment of the reactor core housing.
Figure 3B:
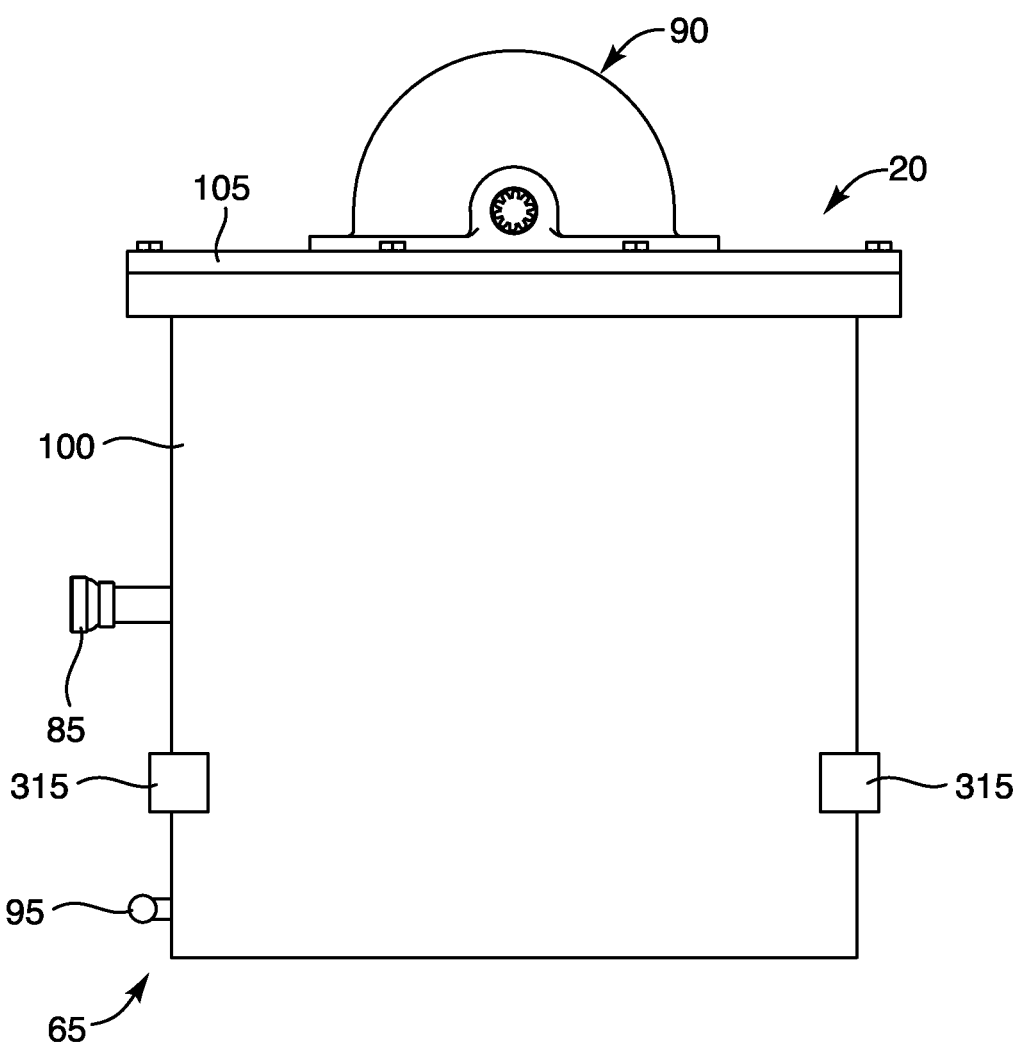
FIG. 3B illustrates a side view of a representative embodiment of the reactor core housing.

With regards to the housing 65, the housing can comprise any suitable component or characteristic that allows the housing to contain the reactor core 70 and to prevent undesired amounts of neutrons and/or gamma radiation from escaping housing. While the housing can further comprise any suitable component that allows it to substantially envelope the core reactor, FIGS. 2A-3B show that, in some embodiments, the housing 65 includes a container 100 having a cover 105 that is selectively removable and/or openable to provide access to the reactor core, reflectors 75, and/or any other suitable component. In some such embodiments, the housing 65 (as shown in FIGS. 2B-2C) further comprises one or more seals 110, which may include, but are not limited to, one or more carbon seals, carbon ropes, carbon-containing materials, rubber seals, gaskets, and/or any other suitable sealing material. Indeed, in some embodiments, FIG. 2C shows the seal 110 between the cover and the container comprises one or more carbon ropes 115.

The housing 65 can comprise any suitable material that allows it to function as intended. Indeed, in some embodiments, the housing comprises one or more metals (e.g., lead, steel, tungsten, nuclear grade metals, and/or any other suitable metals), alloys (e.g., one or more nickel alloys, low-chromium nickel-molybdenum alloys (e.g., HASTELLOY-N™), nuclear grade alloys, and/or other suitable alloys), cements, types of nuclear gunnite, types of nuclear shotcretes, types of mortar, types of reinforced cement, ceramics, synthetic materials, polymers, plastics, hydrogen-based materials, fiberglass, and/or any other suitable materials. In some embodiments, however, the housing comprises a low-chromium nickel-molybdenum alloy, such as HASTELLOY-N™. Additionally, in some embodiments, the housing further comprises one or more liners (e.g., lead, steel, and/or plastic liners), a secondary containment housing, and/or one or more reinforcement elements (e.g., steel rods, steel meshes, fiber reinforcements, composites, and/or any other suitable reinforcements).

Turning now to the reactor core 70, the core can comprise any suitable component or characteristic that allows it to act as a moderator as the fuel passes through it, such that the core is able to help the fuel reach (and/or maintain) a critical state. Some non-limiting examples of such elements include a reactor core tube and one or more end caps, internal moderators, and/or diffusers.

Figure 4A:
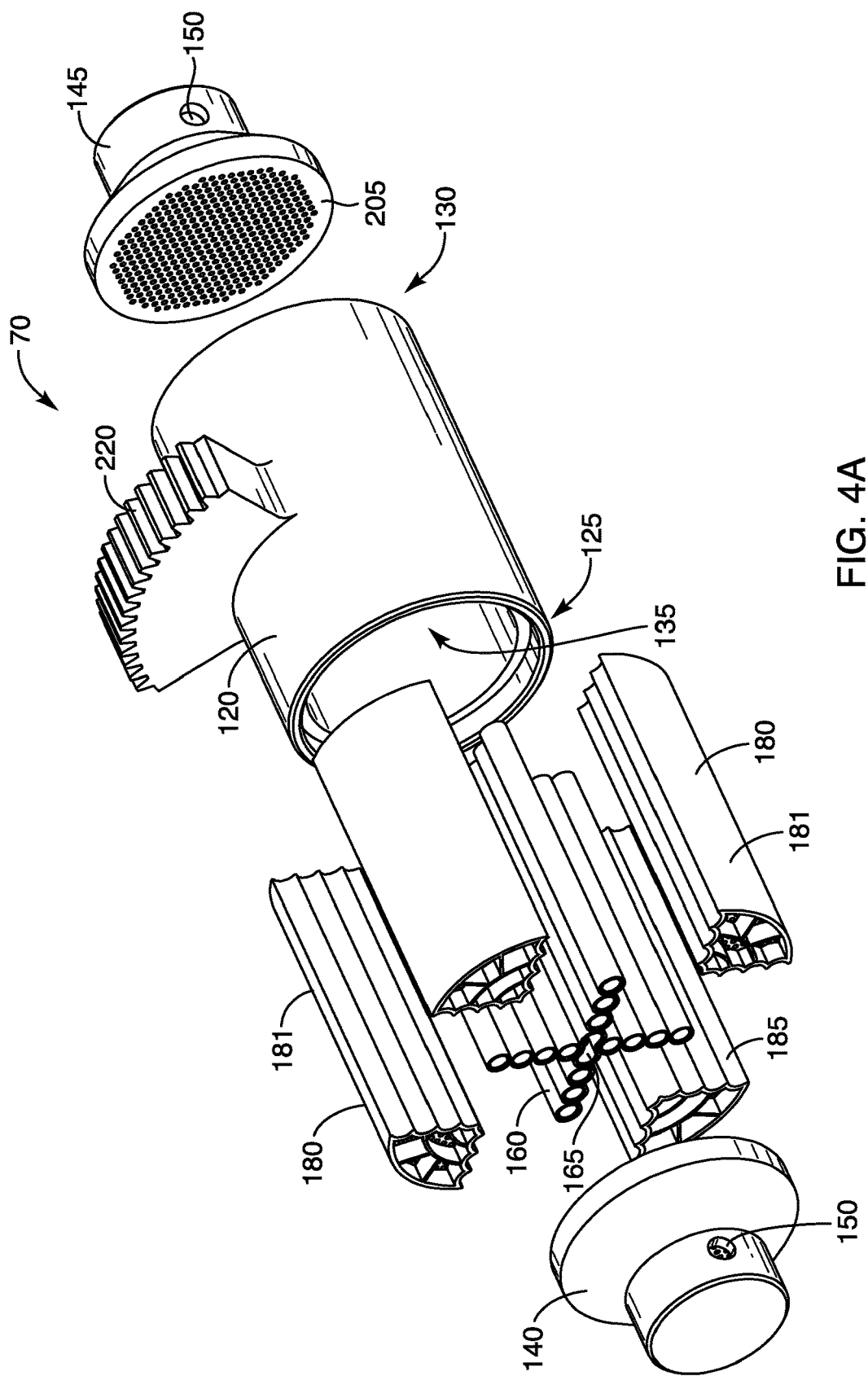
FIG. 4A illustrates a perspective, exploded view of a reactor core, in accordance with a representative embodiment.

With reference to the reactor core tube, the tube can comprise any suitable characteristic that allows it to function as described herein. In this regard, the tube can be any suitable shape, including, without limitation, being cylindrical, polygonal, cuboidal, symmetrical, asymmetrical, tubular, spherical, prism-shaped, and/or any other suitable shape. By way of non-limiting illustration, FIG. 4A shows an embodiment in which the reactor core tube 120 is substantially cylindrical and tubular in shape, having a first end 125 and a second end 130 with an internal space 135 defined between the two ends.

The reactor core tube 120 can be any suitable size. Indeed, while the reactor core tube can be any suitable length, in some non-limiting embodiments, the tube has a length that is between about 0.05 meters (m) and about 30 m, or any length that falls in such range. In this regard, some embodiments comprise a reactor core tube having a length between about 0.3 m and about 2.5 m (e.g., between about 0.5 m and about 0.8 m). In other embodiments, the reactor core tube has length that is even greater than the lengths set forth herein.

While the reactor core tube 120 can have any suitable width or diameter, in some embodiments, the tube has an inner diameter (or ID) that is between about 0.04 m and about 6 m, or any width/diameter that falls in such range. In this regard, some embodiments of the reactor core tube comprise an ID that is between about 0.2 m and about 1 m (e.g., between about 0.25 m and about 0.76 m). Indeed, in some embodiments, the ID (and/or other one or more other measurements of the reactor core tube) is adjusted or otherwise set to meet the needs of a particular fuel, application, and/or a desired energy output.

The walls of the reactor core tube 120 can be any suitable thickness. Indeed, in some embodiments, the distance between the tube's outer diameter (OD) and ID (or wall thickness) is between about 0.1 cm and about 1 m, or any thickness that falls in such range. Indeed, in some embodiments, the tube has a wall thickness that falls between about 1 cm and about 13 cm (e.g., between about 1.5 cm and about 3.5 cm). In other embodiments, the tube's wall can be any other suitable thickness (e.g., based on energy output needs).

With reference now to the end caps, although some embodiments of the reactor core 70 are formed with one or both ends (e.g., ends 140 and/or 145) being closed, in some embodiments, the first and/or second ends of the reactor core tube 120 are capped with an end cap. While the end caps can perform any suitable function, in some embodiments, the end caps are configured to help direct the fuel into and out of the reactor core tube.

While the end caps can comprise any suitable component that allows them to perform their desired function, FIG. 4A shows a representative embodiment in which the first end cap 140 and second end cap 145 each comprises one or more (e.g., 1, 2, 3, 4, 5, 6, or more) fuel ports 150. Additionally, while the end caps can be any suitable shape, FIG. 4A shows an embodiment in which the first 140 and second 145 end caps are flared to respectively help channel fuel from the port 150 in the first cap 140 to the internal space 135 of the reactor core tube 120, and then from the internal space 135 of the reactor core tube 120 to the port 150 in the second cap 145.

Where the reactor core 70 comprises a first 140 and/or second 145 end cap (or fuel heads), the end caps can be coupled to the core through any suitable method. Some example of such methods include, without limitation, being integrally formed with, being threaded together with, via a pressure and/or friction fitting, via one or more mating surfaces (e.g., grooves and corresponding ridges or otherwise), via a luer-taper connection, via one or more seals (e.g., carbon seals, carbon rope seals, rubber seals, and/or other suitable seals), via welding, via one or more adhesives, via one or more mechanical fasteners (e.g., rivets, clamps, clamping mechanisms, reflectors 75 and/or other objects that help press the caps into the reactor core tube 120, screws, bolts, clips, pegs, crimps, pins, brads, threads, brackets, catches, couplers, key-way splines, and/or any other suitable mechanical fasteners), and/or other suitable fastening mechanism. Indeed, in some embodiments, the end caps are coupled to the reactor core tube via a friction fitting, with one or more seals (e.g., carbon ropes and/or other suitable seals) being disposed between the end caps and the reactor core tube to help maintain an air-tight and/or fluid-tight seal between the caps and the reactor core tube.

As mentioned, in some embodiments, the internal space 135 in the reactor core tube 120 comprises one or more internal moderators that are configured to help the fuel reach (and/or maintain) a critical state in the reactor core 70. In this regard, the internal moderators can comprise any suitable component or components that are capable of performing the described function. Some examples of suitable internal moderators include, but are not limited to, one or more rods, balls, pellets, beads, granules, particles, blocks, articles, pipes, graphite gels, gels, pieces, and/or other objects that can be surrounded by and/or filled with the fuel so as to allow the material of the moderator (e.g., carbon, graphite, and/or any other suitable material capable of bringing the cracked fuel to a critical state) to function as a moderator. Indeed, in some embodiments, the internal moderators comprise graphite balls, and more particularly a substantially pure graphite having a purity level of about 99% or greater (e.g., having a graphite purity of at least about 99.9%).

Figure 4B:
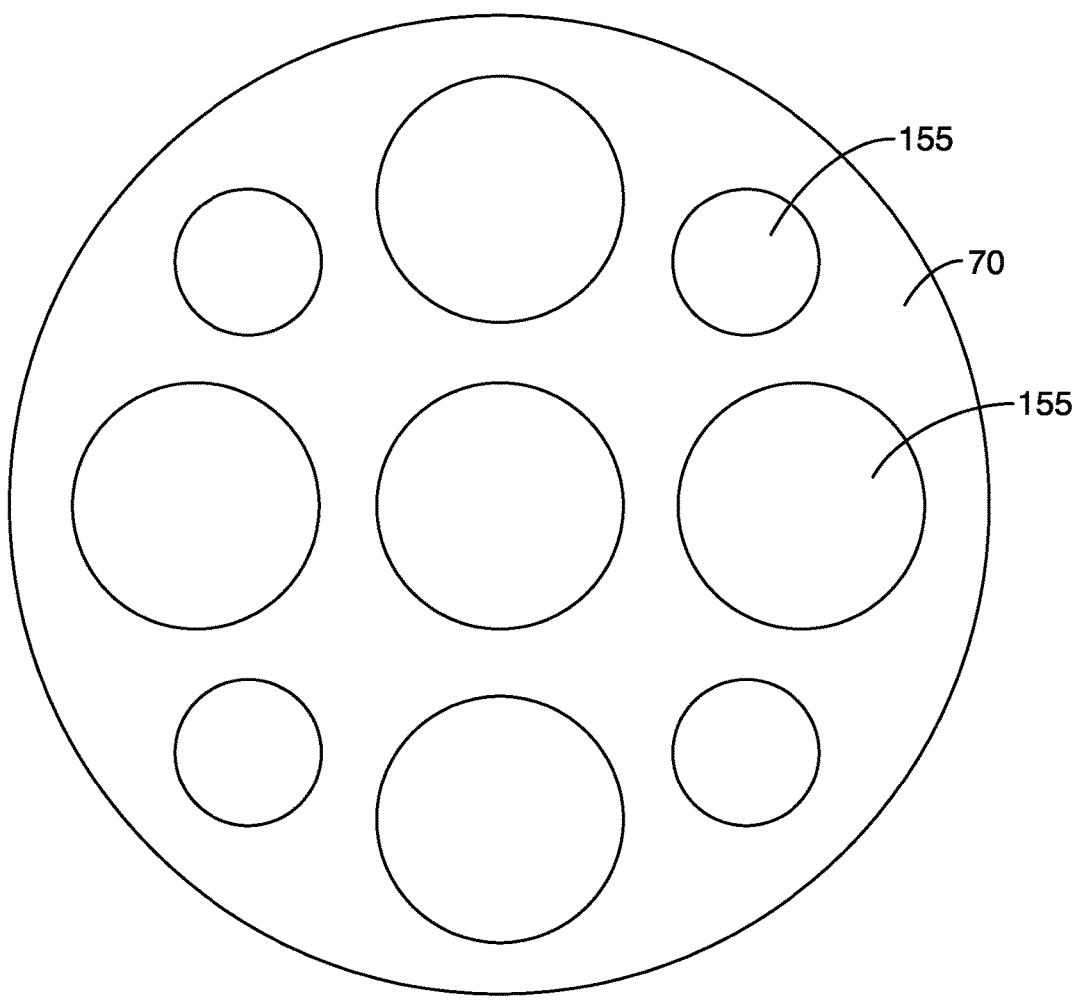
FIGS. 4B-4C each illustrate a cross-sectional view of the reactor core, in accordance with a representative embodiment, and wherein the reactor core itself is configured to act as a moderator.
Figure 4C:
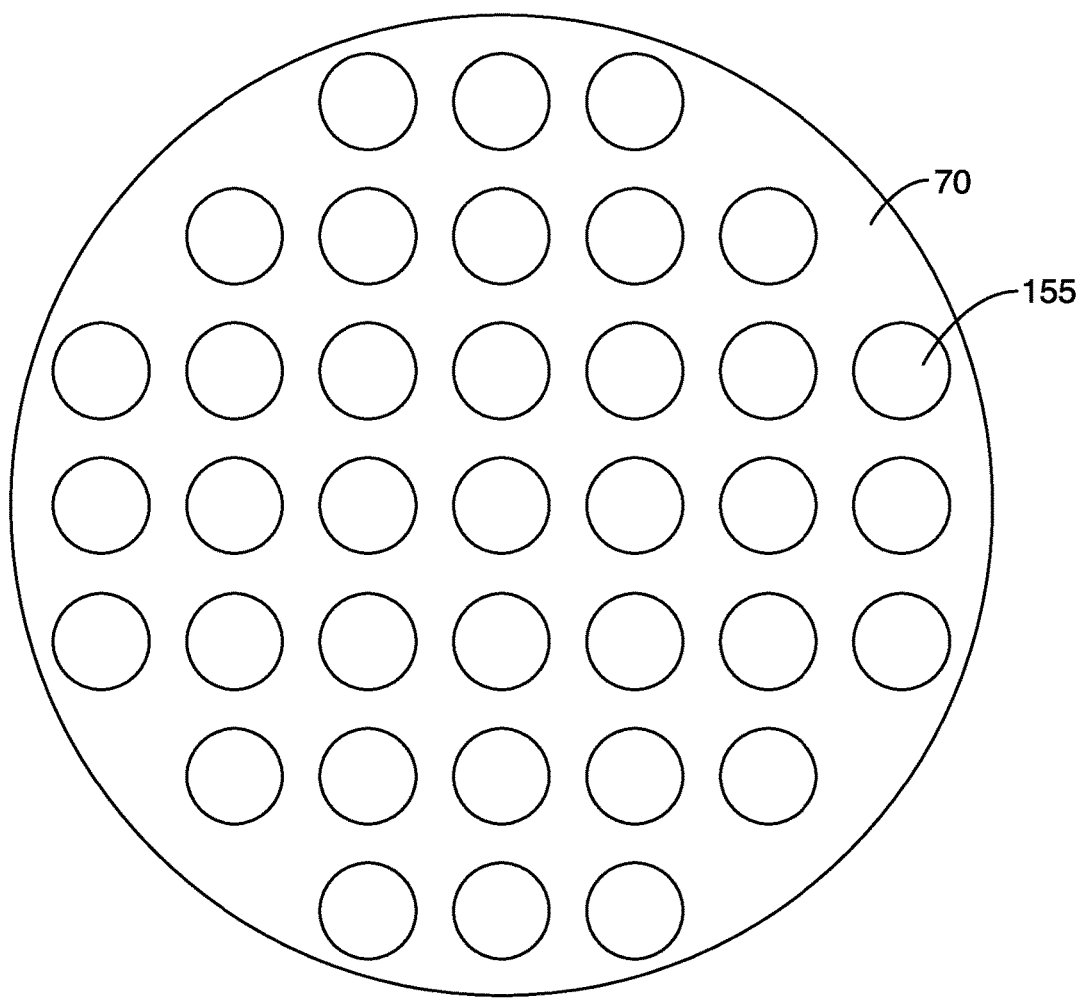
Figure 4D:
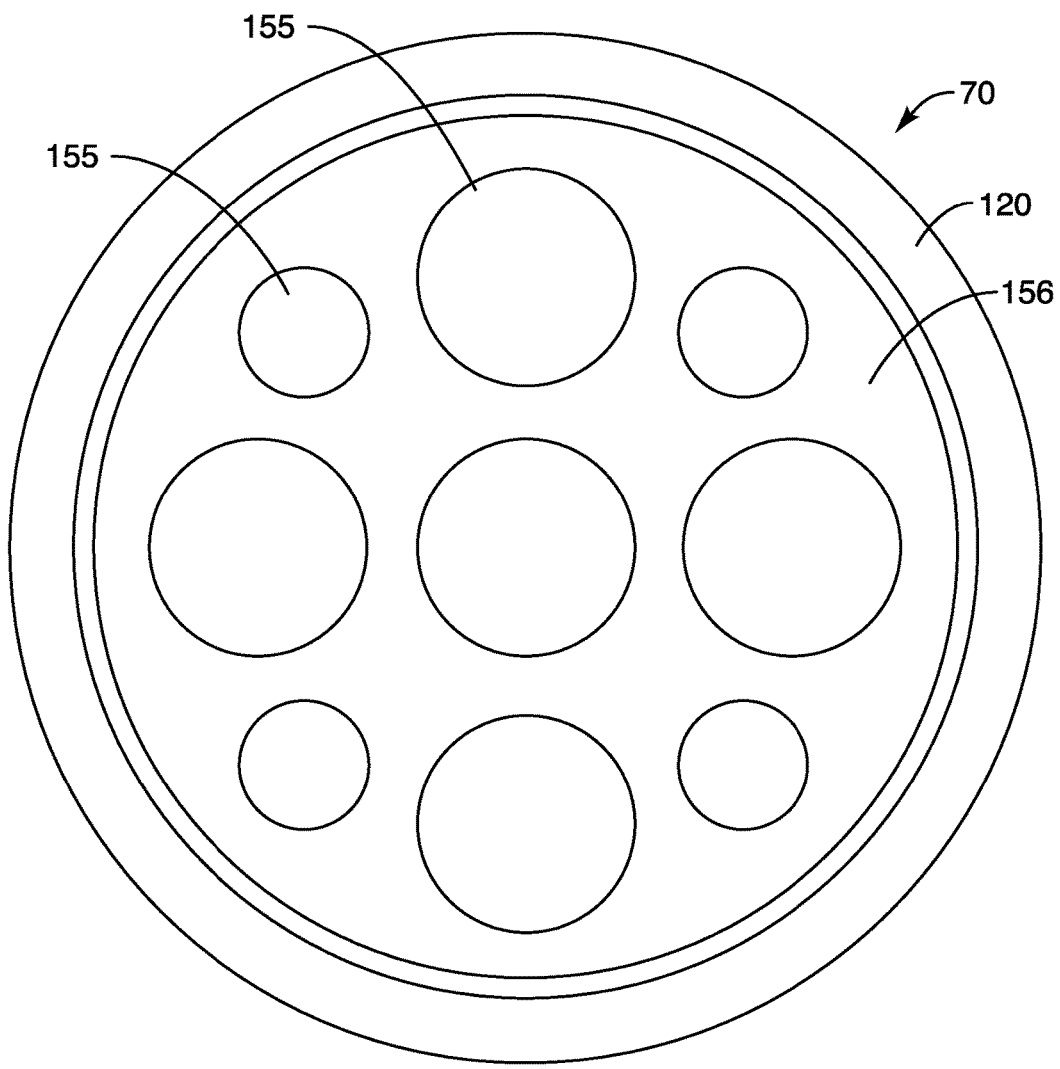
FIG. 4D illustrates, in accordance with a representative embodiment, a cross-sectional view of the reactor core, wherein the reactor core comprises cylindrical insert configured to function as an internal moderator.
Figure 4E:
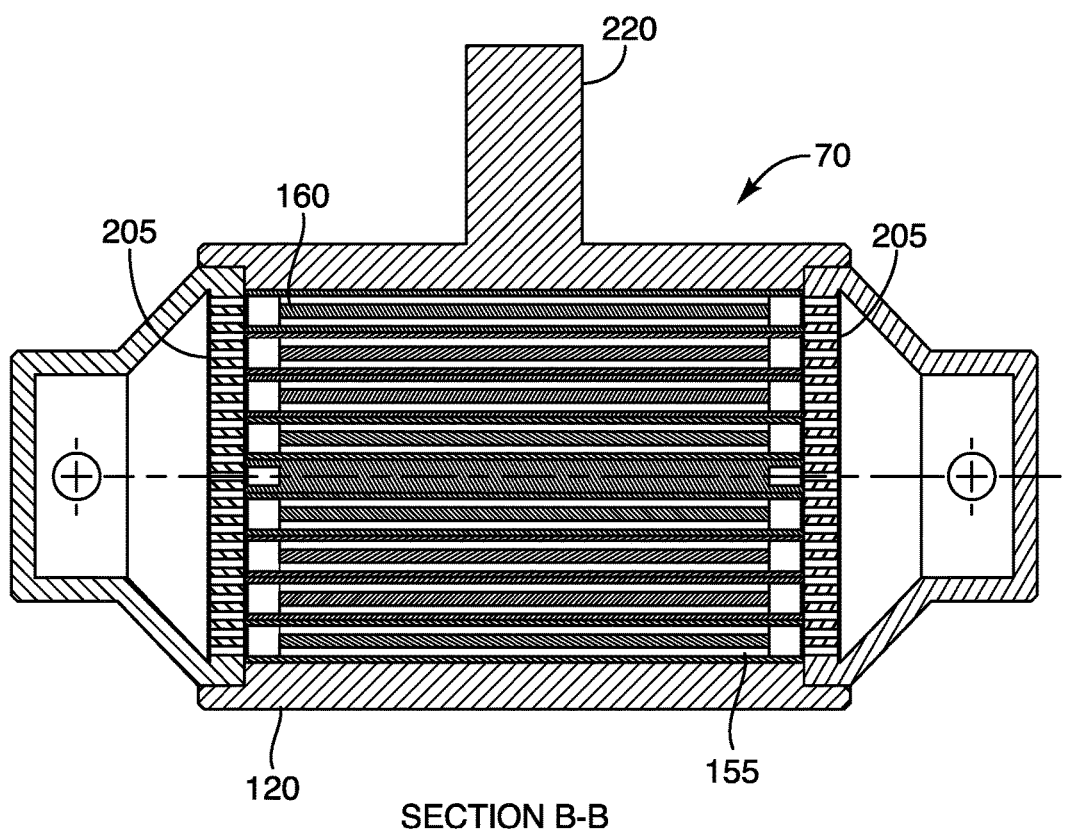
FIG. 4E illustrates a cross-sectional view of the reactor core, in accordance with a representative embodiment.

In some other examples, the internal moderators comprise one or more cylinders, blocks, wedges, pins, rods, balls, solid block inserts defining a plurality of holes, the reactor core 70 itself (e.g., wherein the internal space 135 comprises one or more fuel channels or holes extending through a portion of the reactor core), and/or other suitable objects that define one or more holes therein, wherein such holes are configured to channel the fuel from a first portion (e.g., a first end 125 portion, a first diffuser (as discussed below), and/or a first end cap 140) to a second portion (e.g., a second end 130 portion, a second diffuser (as discussed below), and/or a second end cap 145) of the reactor core. Indeed, in some embodiments, the reactor core itself acts as the internal moderator. In some other embodiments, however, the internal moderators comprise one or more fuel pin rods, fuel wedges, and/or graphite spheres.

Where the reactor core 70 itself acts as the internal moderator, the reactor core can comprise any suitable characteristic that allows it to bring and/or maintain the fuel at a critical state. In some embodiments, the core comprises (e.g., by itself and/or houses) a solid block of material (e.g., graphite, as discussed below) defining one or more fuel channels. In this regard, the core can comprise any suitable number of fuel channels, including, without limitation, between about 1 fuel channel and about 1,000 fuel channels, or any number of channels falling within such range. Indeed, in some embodiments, the reactor core defines between about 3 and about 80 (e.g., between about 3 and about 60) fuel channels. By way of non-limiting illustration, FIGS. 4B and 4C respectively show some embodiments in which the reactor core 70 itself defines 9 and 37 fuel channels 155. Additionally, FIG. 4D illustrates an embodiment in which the reactor core 70 comprises a cylindrical insert 156 that is disposed within the reactor core tube 120, and which defines 9 fuel channels 155.

Where the reactor core 70 comprises one or more fuel pin rods, the fuel pin rods can comprise any suitable component or characteristic that allows them to bring a portion of the molten fuel to (or to be maintained at) a critical state. Indeed, while the pins can be any suitable length, in some embodiments, they are of a sufficient length that allows them to direct fuel from the first end 125 to the second end 130 of the reactor core tube 120.

Figure 4F:
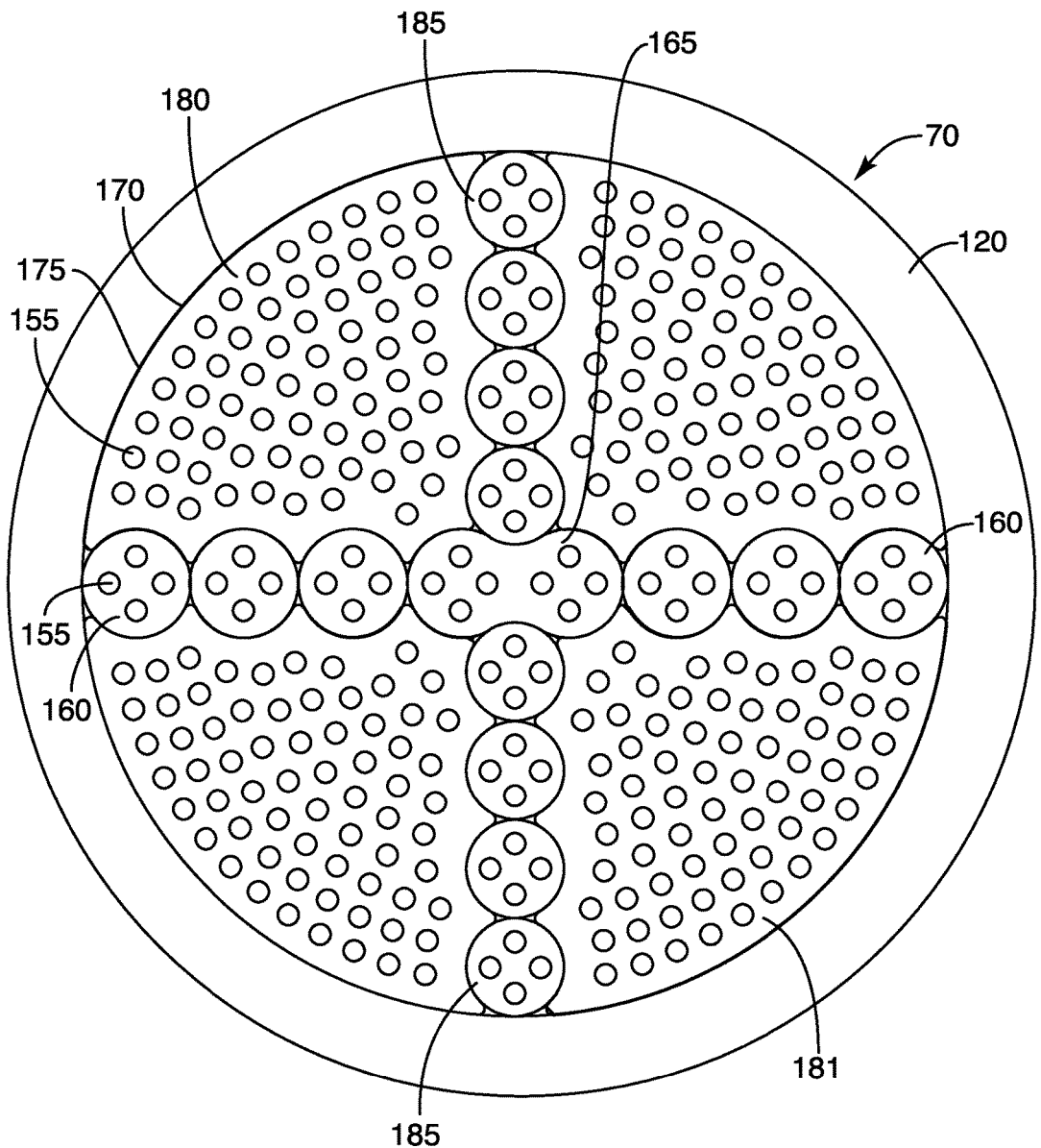
FIG. 4F illustrates, in accordance with a representative embodiment, a cross-sectional view through the reactor core, wherein the core includes multiple fuel pin rods that are disposed between multiple fuel wedges.

Additionally, in some embodiments, the pins define one or more holes, or fuel channels, that extend through a length of the pins to channel the fuel from the reactor core tube's first end 125 to its second end 130. The channels can be disposed in the pins in any suitable manner, including, without limitation, by running substantially parallel with a longitudinal axis running through a length of the pins, by corkscrewing through the pins, by extending through the pins at an angle, by rotating though the pins, by spiraling through the pins, and/or in any other suitable manner. In accordance with some embodiments, however, FIGS. 4A-4E show that the fuel channels 155 (which may also be referred to as internal fuel conduits and holes) run substantially straight through the pins 160 (e.g., parallel with the pins' longitudinal axes).

Where the reactor core 70 comprises one or more pins 160, the pins can each define any suitable number of holes that allow the core to bring and/or maintain the fuel at a critical state. In this regard, each pin can comprise 1, 2, 3, 4, 5, 6, 7, 8, 9, 10, 11, 12, 13, 14, 15, or more holes. By way of non-limiting illustration FIG. 4F shows an embodiment in which several pins 160 comprise four fuel channels 155, while a center pin 165 comprises eight fuel channels 155.

The pins 160 can be any suitable shape, including, without limitation, being substantially cylindrical; tubular; cuboidal; rectangular-prism-shaped; triangular-prism-shaped; polygonal-prism-shaped; pill-shaped (e.g., cylindrical with rounded ends); having an outer perimeter with a cross-sectional appearance resembling that of a peanut, cells in anaphase, cells in telophase, and/or a double-barreled shotgun; having a cross-sectional view resembling 2, 3, 4, 5, 6, or more intersecting circles; having or more corresponding shapes that fit together to substantially fill a portion of the reactor core 70; and/or any other suitable shape. By way of non-limiting illustration, FIGS. 4A and 4F show some embodiments in which the pins 160 have a cylindrical shape and/or (in the case of the center pin 165 shown in FIGS. 4A and 4F) a cross-sectional view resembling cells in telophase.

Where the reactor core 70 comprises, one or more pins 160, the reactor core can comprise any suitable number of pins that allows the reactor core to function as described herein. In this regard, while some embodiments of the core comprise no pins, other embodiments comprise between about 1 and about 1,000 pins, or any subrange thereof. Indeed, in some embodiments, the reactor core comprises between about 1 and about 80 pins, or any subrange thereof (e.g., between about 12 and about 50 pins). By way of non-limiting illustration, FIG. 4F shows an embodiment in which the reactor core 70 comprises a total of 15 pins (as shown by pins 160 and 165).

Although, in some embodiments, the internal space 135 is mostly (if not entirely) filled with fuel pin rods 160, in other embodiments, in addition to (or in place of) the pins, the internal space houses one or more wedges. In this regard, the term wedge may be used to describe any suitable internal moderator having a surface that is configured to substantially contour with an inner surface of the reactor core 70 (e.g., an inner surface of the reactor core tube 120) and/or to come into contact with such inner surface at more than one place. For instance, in some embodiments in which the reactor core tube 120 defines an interior surface having a polygonal, rounded, contoured, and/or irregular surface, an outer surface of one or more fuel wedges is configured to substantially contour such interior surface and/or to at least contact such surface in more than one location at a time. In this regard, FIG. 4F shows an embodiment in which the reactor core tube 120 defines a cylindrical interior surface 170, and in which an outer surface 175 of each of the fuel wedges 180 is curved and configured to substantially correspond in shape with the interior surface 170 of the reactor core tube 120.

Figure 4G:
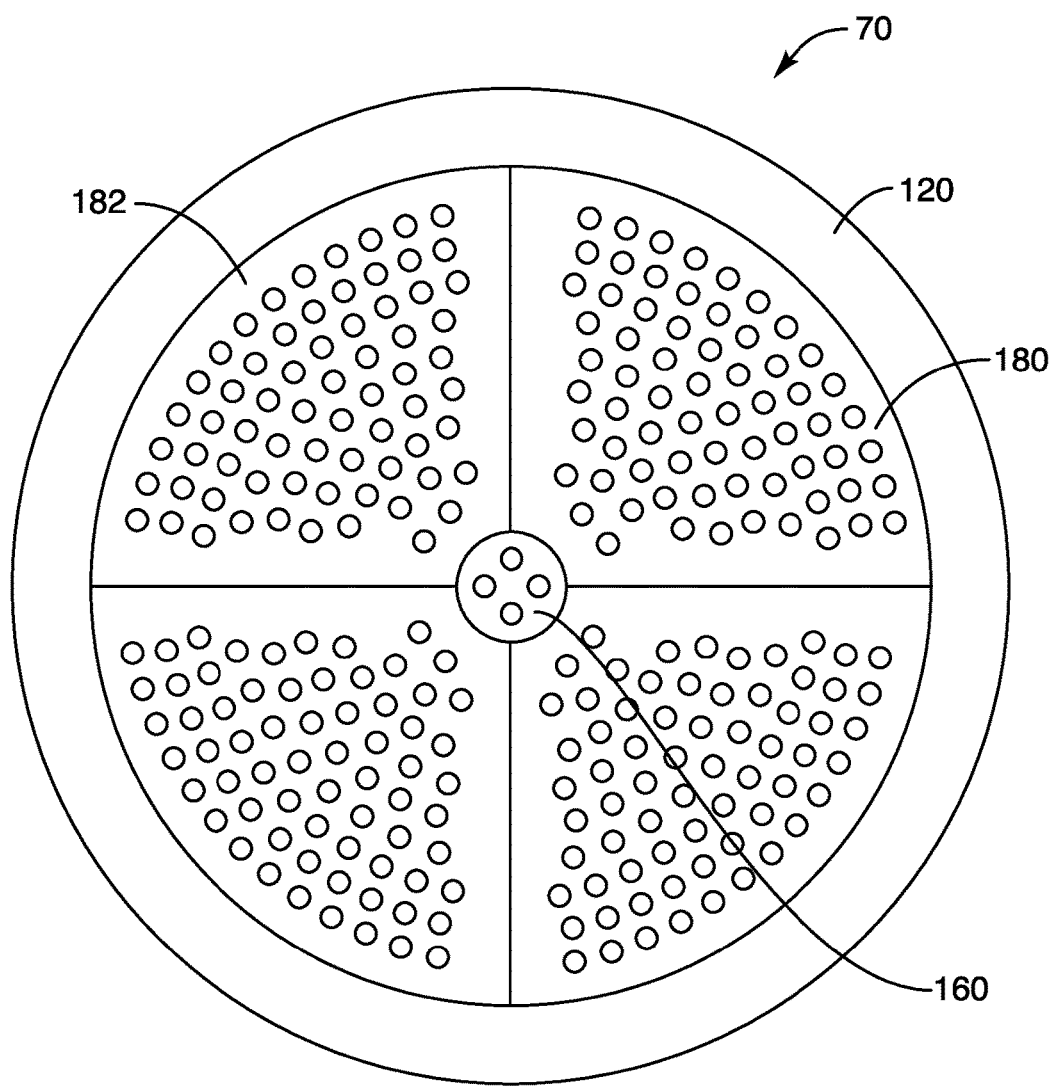
FIG. 4G illustrates a cross-sectional view through a reactor core having multiple fuel wedges and a fuel pin rod, in accordance with a representative embodiment.
Figure 4H:
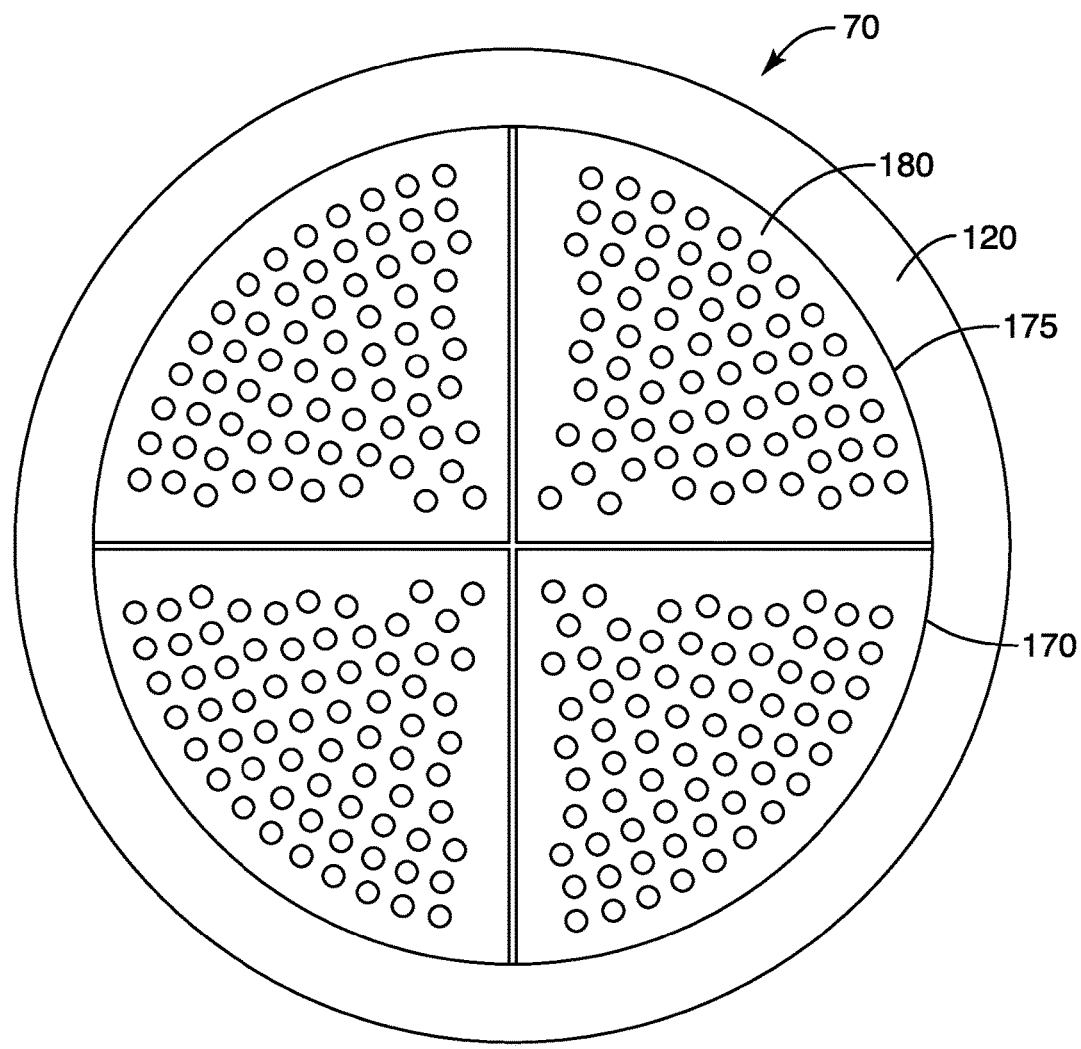
FIG. 4H illustrates a cross-sectional view through a reactor core having multiple fuel wedges, in accordance with a representative embodiment.
Figure 4I:
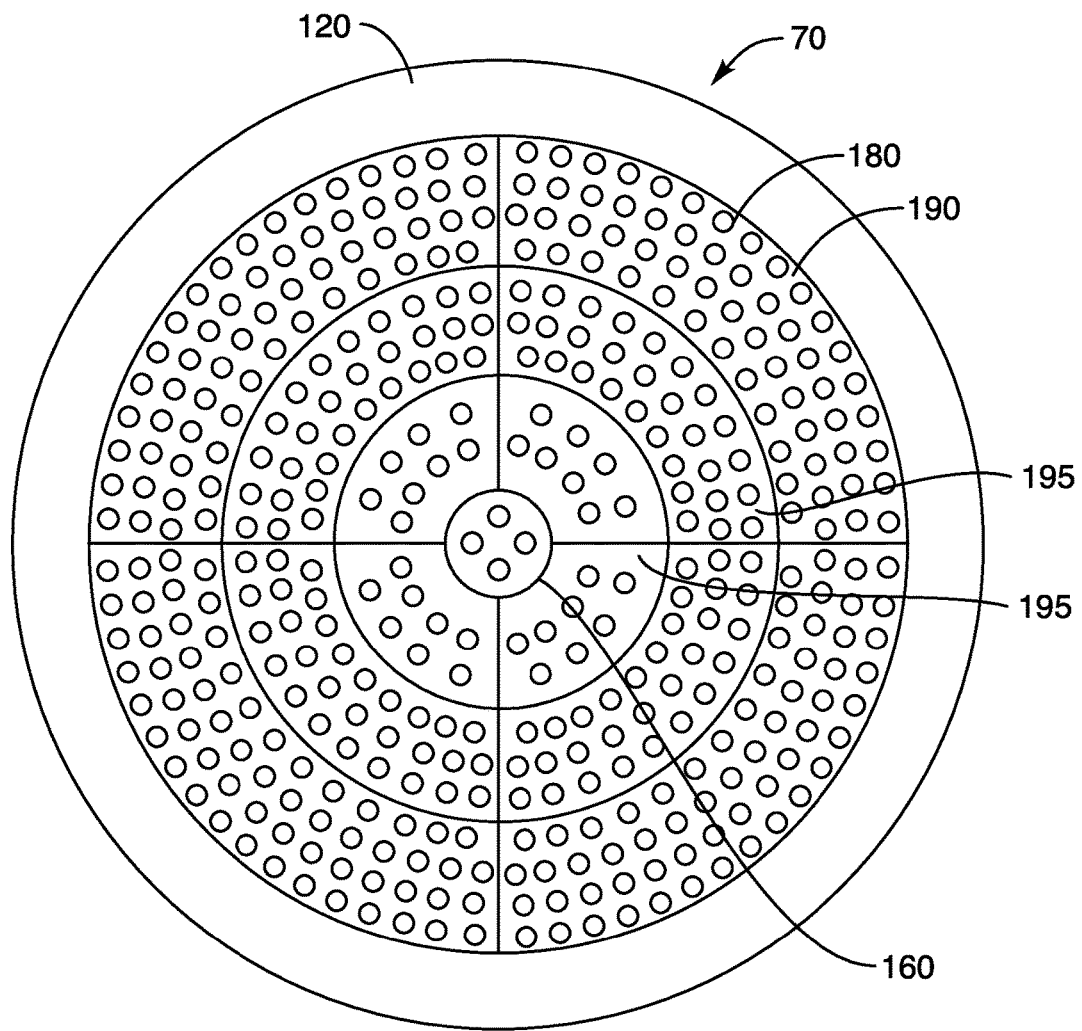
FIG. 4I illustrates a cross-sectional view through a reactor core having multiple arc-shaped fuel wedges and the fuel pin rod, in accordance with a representative embodiment.

The fuel wedges 180 can have any suitable shape that allows the reactor 20 to function as intended. Some non-limiting examples of suitable shapes include that of geometrical sector-shaped prism, an arc-shaped prism, a polygonal prism, a rounded prism, and/or any other suitable shape. In accordance with some embodiments, however, FIG. 4F (and FIG. 4A) illustrates an embodiment in which the fuel wedges 180 comprise a substantially wedge-shaped prism 181, having a plurality of rounded surfaces 185 that are configured to hold one or more pins (e.g., pins 160 and/or 165). FIG. 4G illustrates an embodiment in which the reactor core 70 comprises multiple substantially-sector-shaped wedges 182, having a pin 160 disposed between the wedges. In particular, while the reactor core 70 can comprise any suitable number of wedges (i.e., 1, 2, 3, 4, 5, 6, 7, 8, 9, 10, or more) FIG. 4G shows an embodiment in which the core 70 comprises four wedges 180. Additionally, FIG. 4H illustrates an embodiment in which the wedges 180 are substantially sector-shaped, and wherein there are no pins disposed within the reactor core 70. Furthermore, FIG. 4I illustrates an embodiment in which the reactor core 70 comprises a plurality of arc-shaped prism wedges 190 surrounding a plurality of arc-shaped prism internal moderators 195 and a fuel pin 160.

Where the reactor core 70 itself, an insert in the core (e.g., the cylindrical insert 156), the pins 160, the wedges 180, and/or one or more other internal moderators each comprise one or more fuel channels 155 that are configured to direct fuel from a first portion (e.g., a first end 125 portion, a first diffuser (as discussed below), and/or a first end cap 140) to a second portion (e.g., a second end 130 portion, a second diffuser (as discussed below), and/or a second end cap 145) of the reactor core 70, the channels can be any suitable size that allows the fuel to flow through the channels. In some embodiments, the holes have an ID that is between about 0.05 cm and about 60 cm, or any ID that falls in such range (e.g., between about 0.5 cm and about 4 cm). Indeed, in some embodiments, the holes in the pins have an ID between about 0.9 cm and about 30.5 cm. In other embodiments, the fuel channels have an ID between about 0.95 cm and about 23 cm. By way of non-limiting illustration, FIG. 4B illustrates an embodiment in which the reactor core 70 defines fuel channels 155 that have an ID of about 0.95 cm (±0.9 cm). FIG. 4B illustrates an embodiment in which the reactor core 70 defines fuel channels 155 of two different sizes, which have an ID of between about 20 cm (±2 cm) and about 12 cm (±2 cm). FIG. 4C, on the other hand, illustrates an embodiment in which the reactor core 70 defines fuel channels 155 having an ID of about 7.6 cm (±2 cm).

Although in some embodiments, the internal moderator or moderators (e.g., the fuel pins 160, fuel wedges 180, cylindrical insert 156, and/or other suitable moderators) are configured to substantially fill the reactor core 70 when the core is cool, in some embodiments, internal moderators are sized so as to be slightly smaller than the internal space 135 of the reactor core tube 120—thus allowing the internal moderators to expand (as they are heated) to substantially fill the internal space without expanding so much that they crack or break the reactor core tube.

While the internal moderators can be any suitable size at standard temperature and pressure (or STP) that allows the reactor 20 to function as intended, in some embodiments, the volume (and/or length) of all of the internal moderators is configured to be between about 0.01% and about 15%, or any subrange thereof, smaller than the internal volume (and/or diameter or length) of the reactor core tube 120 at STP. Indeed, in some embodiments, the internal moderators (as a whole) have a total volume (and/or diameter or length) that is anywhere between about 1% and about 10% (e.g., between about 2.5% and about 5.5%) smaller than the internal volume (and/or diameter or length) of the reactor core tube at STP.

The ends of the internal moderators (e.g., the reactor core 7 itself, the cylindrical insert 156, the fuel pins 160, and/or fuel wedges 180) can have any suitable shape that allows them to be used in the reactor core 70. Indeed, in some embodiments, the ends of the pins, wedges, inserts, etc. are substantially flat; are rounded; include one or more walls, spacers, protuberances, and/or other standoffs that are configured to space openings to the various fuel channels 155 away from an object (e.g., an end cap 140 or 145, or a diffuser, as discussed below); and/or are otherwise shaped to allow the fuel to enter into one end of, and to exit from an opposite end of, the various moderators. By way of non-limiting illustration, FIGS. 4J-4K illustrate some embodiments in which the pins 160 and 165 and the wedges 180 each comprise one or more standoffs 200 that are configured to space openings for the fuel channels 155 away from an object (e.g., a diffuser 205, the first end cap 140, the second end cap 145, and/or any other suitable object).

Where one or more of the internal moderators (e.g., the fuel pins 160, fuel wedges 180, etc.) comprise one or more standoffs, the standoffs can be any suitable length. Indeed, in some embodiments, the standoffs at a first end or second end of the fuel pins, and/or fuel wedges are, individually, any suitable length between about 0.01 cm and about 20 cm, or any subrange thereof. Indeed, in some embodiments, the standoffs at one or both ends of the pins and/or wedges are, at each end, between about 1 cm and about 5 cm. In still other embodiments, the standoffs at one or both ends of the pins and/or wedges are, individually, between about 2 cm and about 4 cm (e.g., about 3.8 cm±0.5 cm). In still other embodiments, the standoffs are any other suitable length (e.g., based on energy output needs, fuel flow needs, and/or any other suitable factor).

With reference now to the diffusers 205, the reactor core 70 can comprise any suitable baffle, channels, meshes, tubing, blocks, and/or other diffusers that are capable of distributing fuel from the first end cap 140 into the fuel channels 155 in the pins 160 and/or wedges 180, and/or from the fuel channels in the pins and/or wedges and into the second end cap 145. More particularly, the diffuser can comprise any suitable component (e.g., a manifold connected, fuel lines, holes, flutes, and/or any other suitable characteristic) that allows the diffuser to direct fuel to one or more portions of the reactor core (or internal moderator).

Figure 4J:
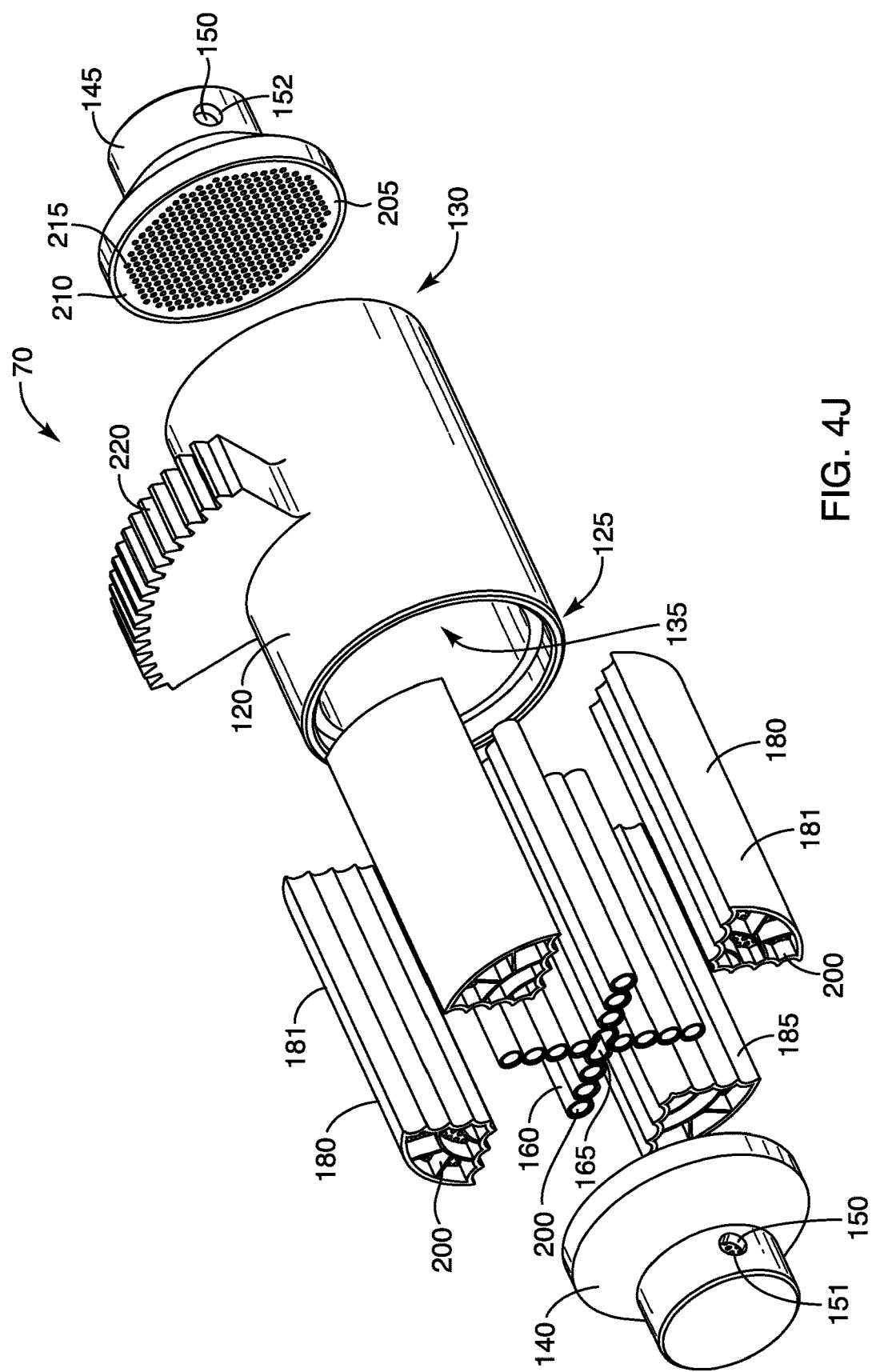
FIG. 4J illustrates a perspective, exploded view of the reactor core, in accordance with a representative embodiment.
Figure 4K:
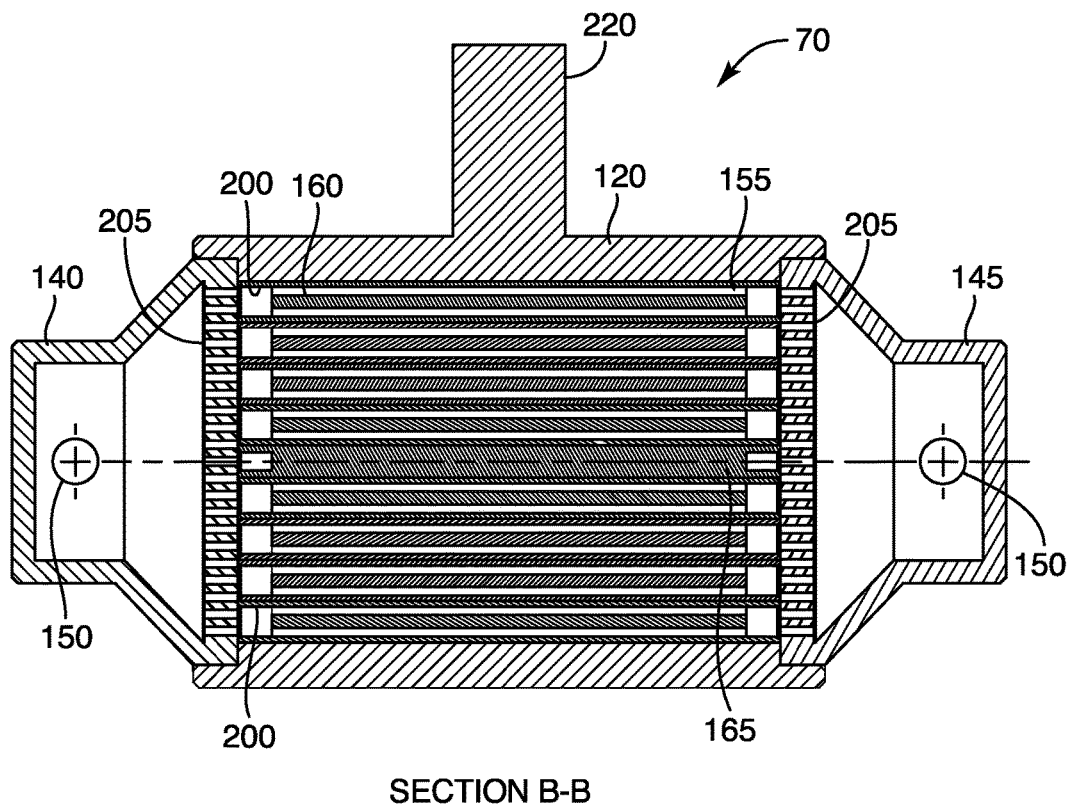
FIG. 4K illustrates a cross-sectional view of the reactor core, in accordance with a representative embodiment.

In accordance with some embodiments, FIG. 4J shows the diffuser 205 comprises a plate 210 with one or more holes 215, with the plate being disposed between the fuel port 150 of the corresponding end cap (e.g., end caps 140 and/or 145) and the pins 160 and/or wedges 180. Additionally, FIG. 4A shows an embodiment in which the diffusers 205 are formed with the end caps (e.g., end caps 140 and/or 145). In accordance with some other embodiments, however, (and as shown in FIG. 4J) the diffusers 205 are formed separate from the end caps (e.g., end caps 140 and/or 145) so as to be inserted into one of the end caps, sandwiched between an end cap and a portion of the reactor core 70, and/or to be placed in any other suitable location.

Where the reactor core 70 comprises one or more diffusers 205 defining a plurality of holes (see holes 215 in FIG. 4J), any suitable portion of the diffusers' surface area define holes that are configured to channel fuel. Indeed, in some embodiments, the area of the holes in a face of each diffuser is between about 50% and about 150% (or falls in any suitable subrange thereof) of the area of the fuel channels 155 in a face of the reactor core and/or the internal moderator. Indeed, in some embodiments, the area of the holes in a face of each diffuser is about equal (±10%) to the area of the fuel channels in a face of the reactor core and/or the internal moderator.

Turning now to the fuel inlets 80 fuel outlets 85, the reactor 20 can comprise any suitable number of fuel inlets and outlets (e.g., 1, 2, 3, 4, 5, 6, or more) that allows fuel to selectively pass through one or more fuel ingress ports 151 (or inlets) at a first end of the reactor (e.g., the first end cap 140) and to then exit through one or more fuel egress ports 152 (or outlets) at a second end of the reactor (e.g., the first end cap 145). In one non-limiting illustration, however, FIG. 2B shows an embodiment in which the reactor 20 comprises one fuel inlet 80 and one fuel outlet 85. Additionally, while the fuel inlets can be any suitable shape (e.g., circular, polygonal, and/or any other suitable shape), in some embodiments, an egress from the fuel inlet and ingress to the fuel outlet substantially correspond with a shape of a corresponding fuel port 150. Indeed, in some embodiments, in which the fuel ports are substantially circular in shape, the egress from the fuel inlet and the ingress to the fuel outlet are also substantially circular in shape.

While the fuel inlets 80 and fuel outlets 85 can be made of any suitable materials (e.g., graphite, one or more nickel alloys, low-chromium nickel-molybdenum alloys (such as HASTELLOY-N™), metals, cements, ceramics, synthetic materials, composites, and/or any other suitable materials), in some embodiments, the fuel inlet and outlet each comprise a low-chromium nickel-molybdenum alloy (e.g., HASTELLOY-N™ materials), with one or more seals (e.g., carbon seals, carbon rope seals, composites, and/or other suitable seals) being disposed between the inlet and outlet and the corresponding end cap (e.g., the first 140 or second 145 end cap) to which they extend. Indeed, in some embodiments, the fuel inlets 80 and outlets 85 comprise a HASTELLOY-N™ material that is lined with graphite.

Figure 4L:
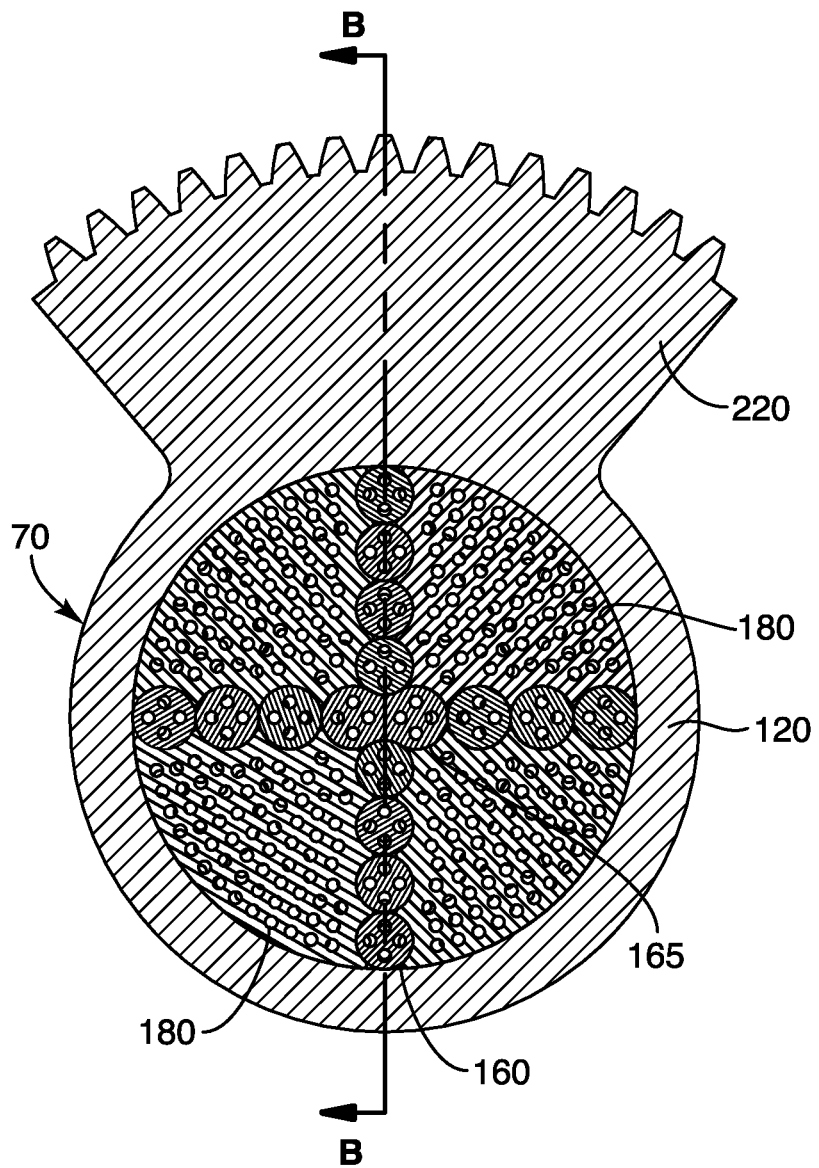
FIG. 4L illustrates a cross-sectional view through a reactor core tube, the fuel pin rods, and the fuel wedges, in accordance with a representative embodiment.
Figure 4M:
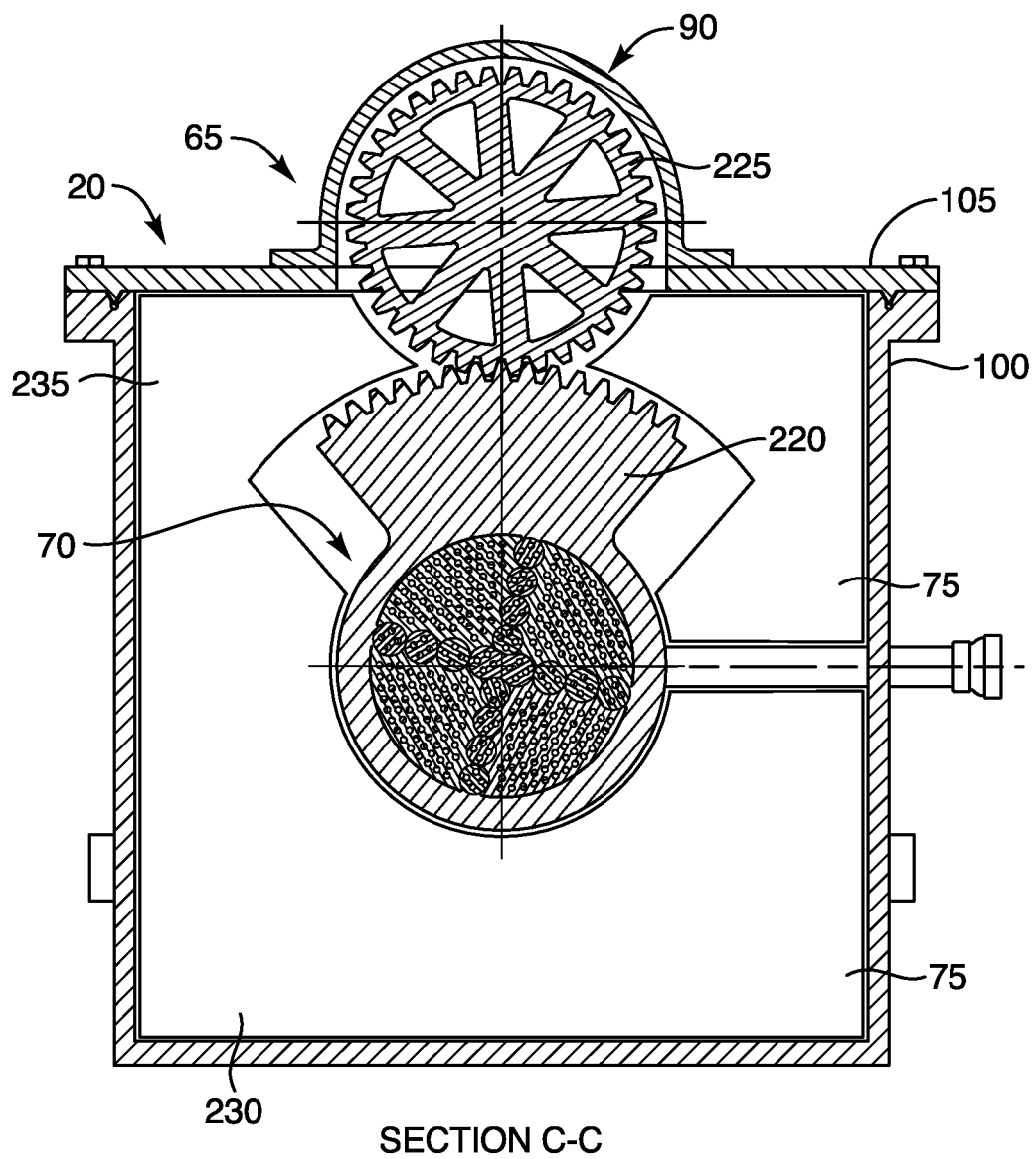
FIG. 4M illustrates a cross-sectional view through the reactor core housing, in accordance with a representative embodiment.
Figure 5A:
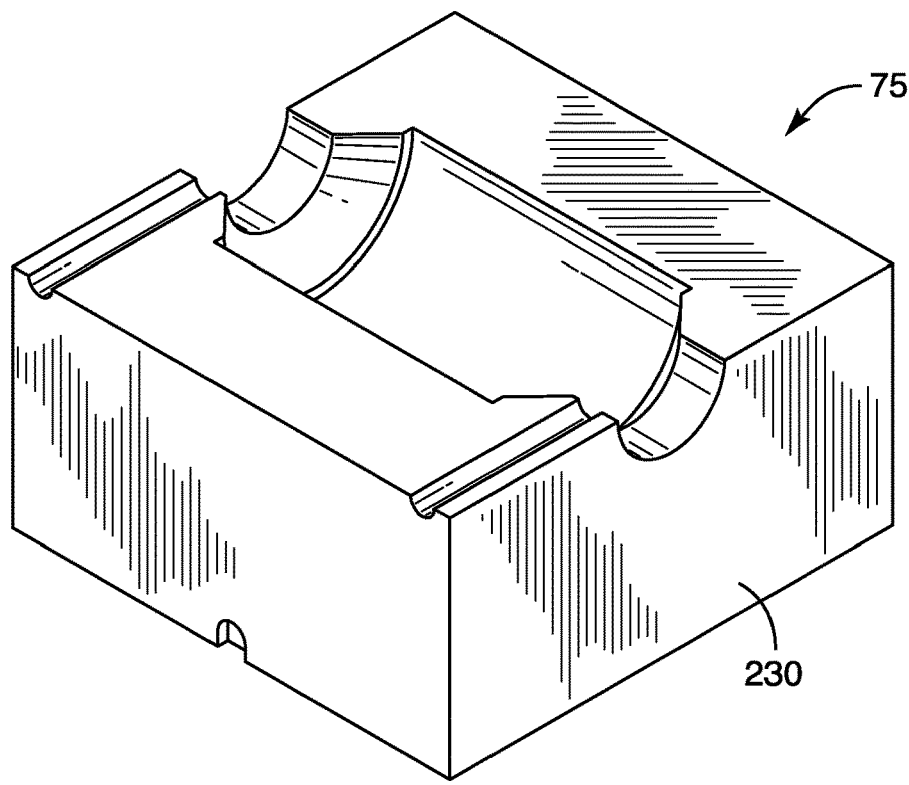
FIG. 5A illustrates a perspective view of a bottom reflector, in accordance with a representative embodiment.
Figure 5B:
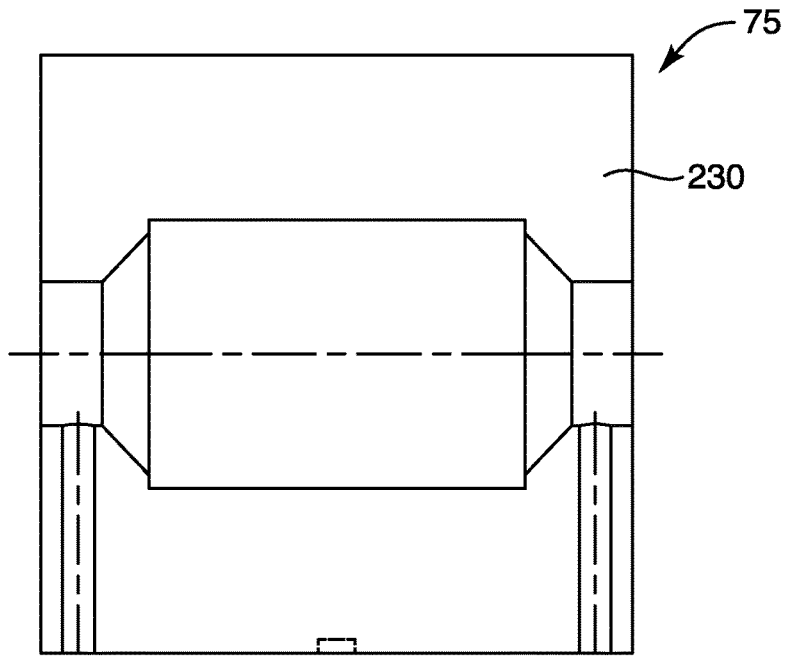
FIG. 5B illustrates a top view of the bottom reflector, in accordance with a representative embodiment.
Figure 5C:
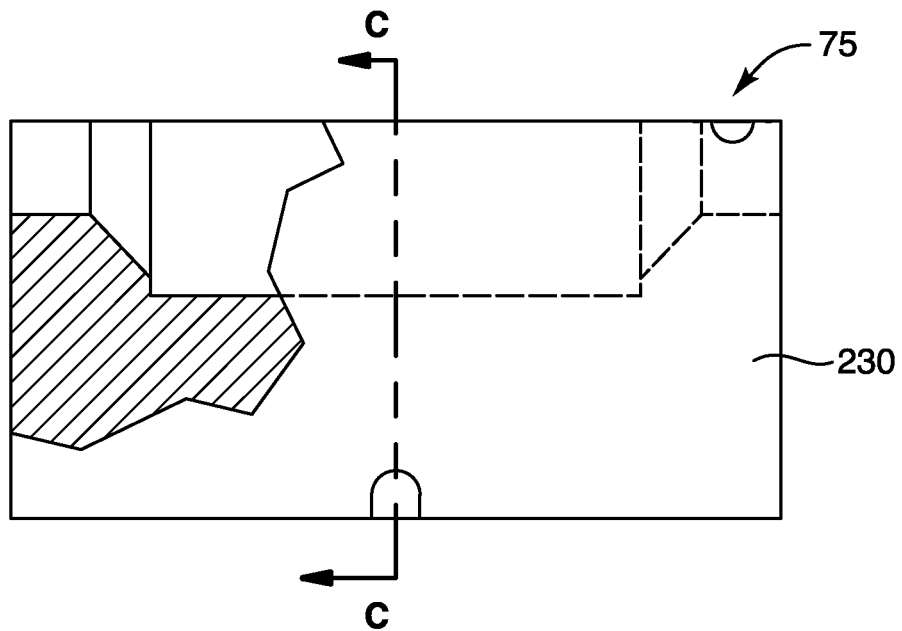
FIG. 5C illustrates a partial break-away view of the bottom reflector, in accordance with a representative embodiment.
Figure 5D:
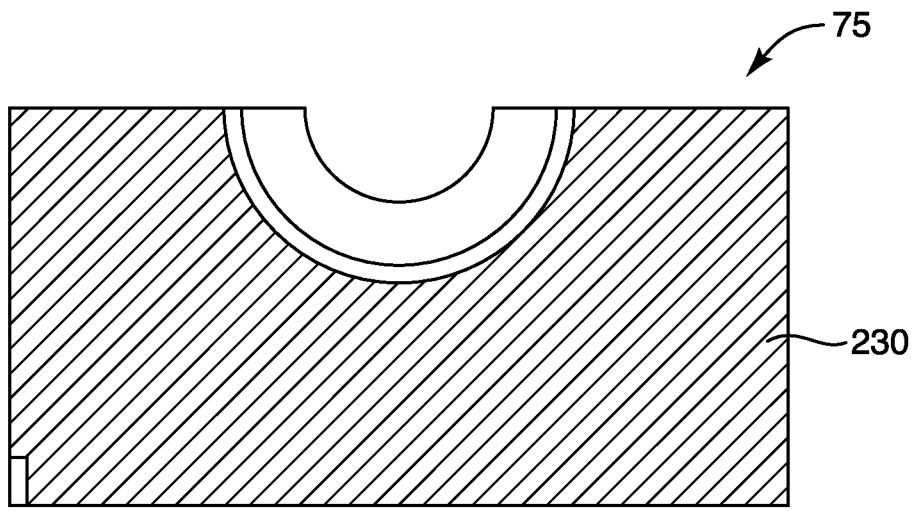
FIG. 5D illustrates a side, cross-sectional view of the bottom reflector, in accordance with a representative embodiment.
Figure 6A:
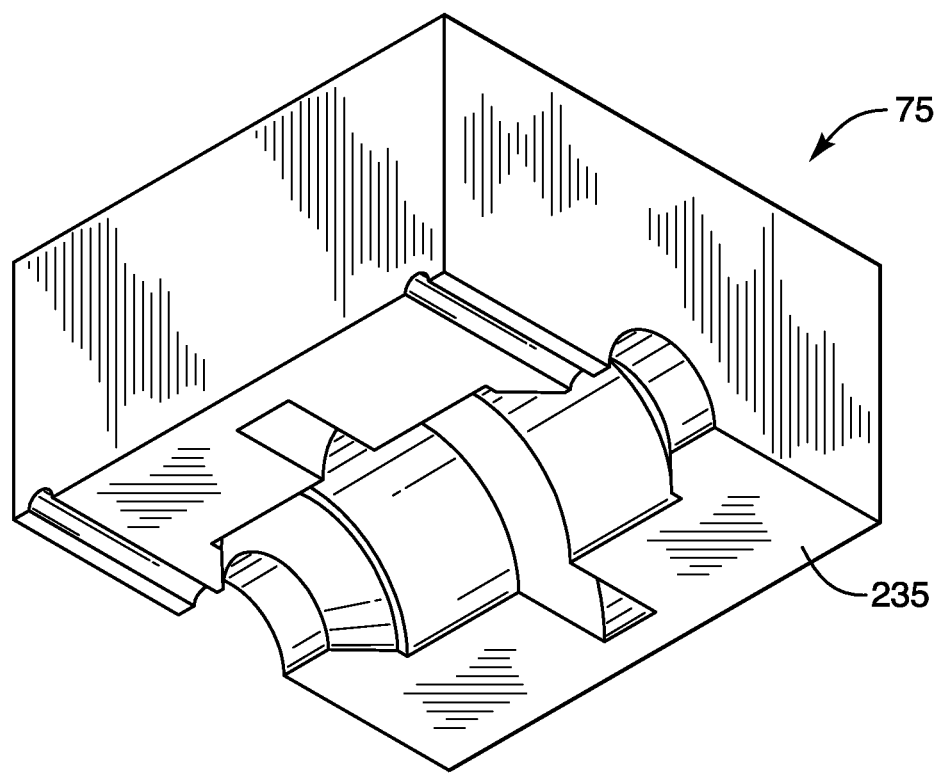
FIG. 6A illustrates a perspective view of a top reflector, in accordance with a representative embodiment.
Figure 6B:
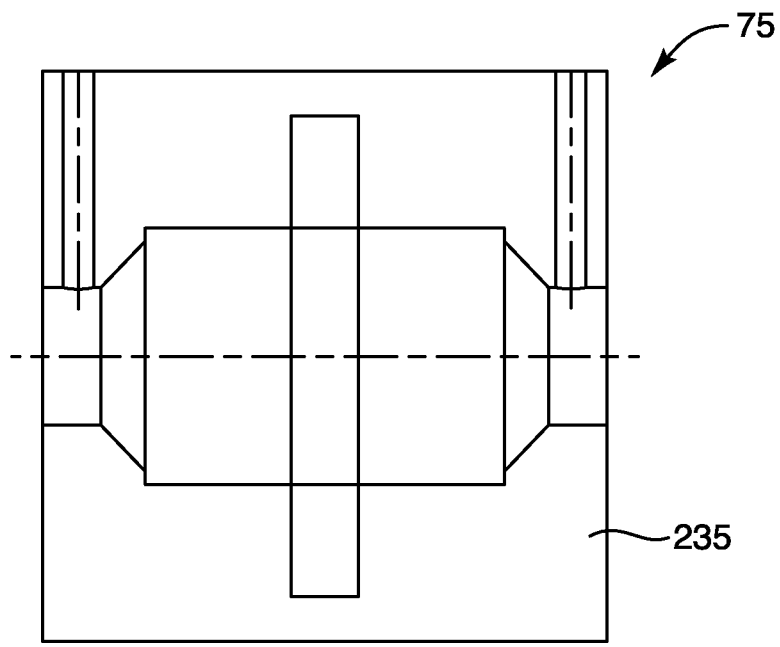
FIG. 6B illustrates a bottom view of the top reflector, in accordance with a representative embodiment.
Figure 6C:
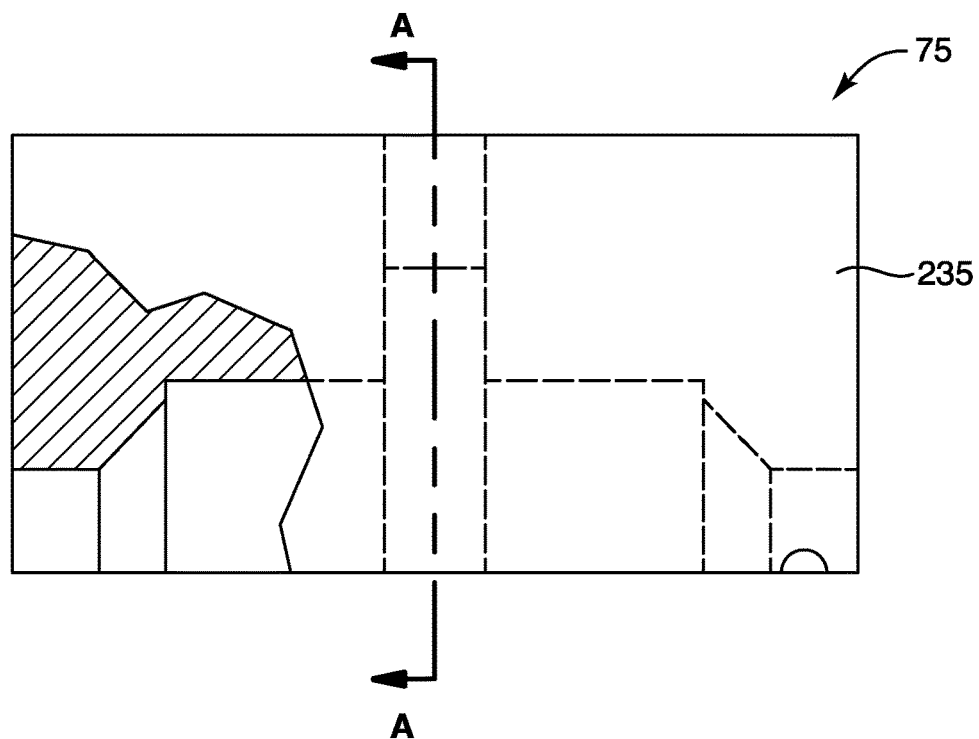
FIG. 6C illustrates a partial break-away view of the top reflector, in accordance with a representative embodiment.
Figure 6D:
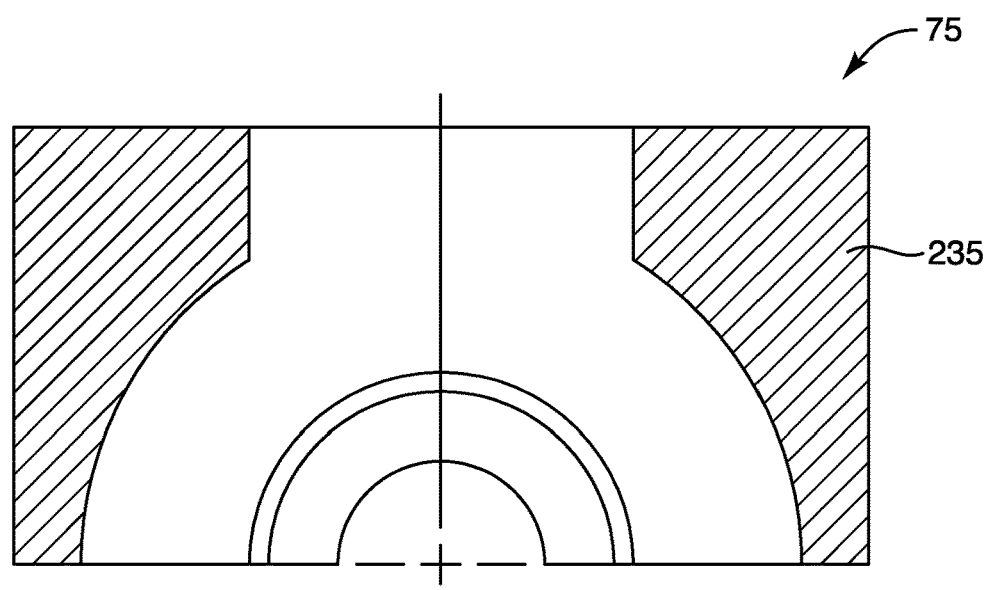
FIG. 6D illustrates a side, cross-sectional view of the top reflector, in accordance with a representative embodiment.
Figure 7A:
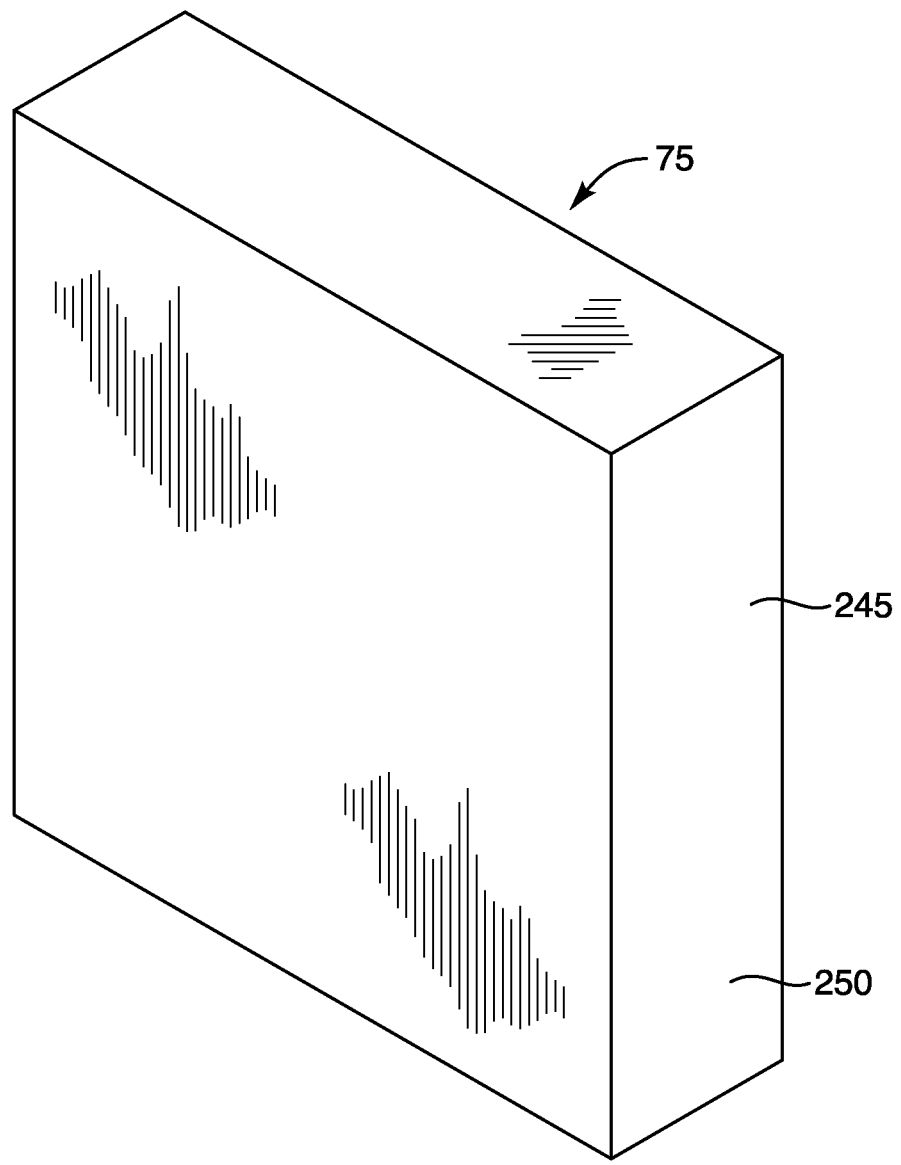
FIG. 7A illustrates a prospective view of a side reflector, in accordance with a representative embodiment.
Figure 7B:
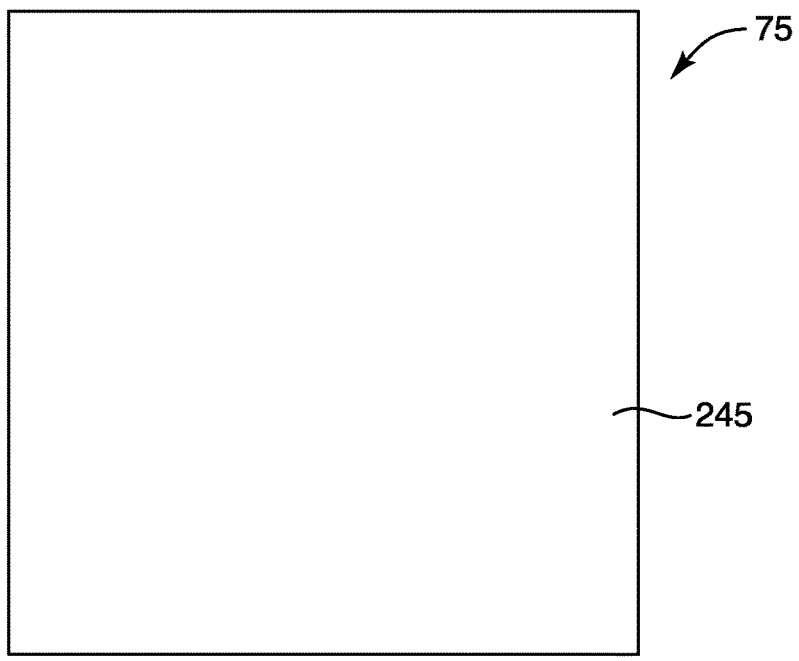
FIG. 7B illustrates a front view of the side reflector, in accordance with a representative embodiment.
Figure 7C:
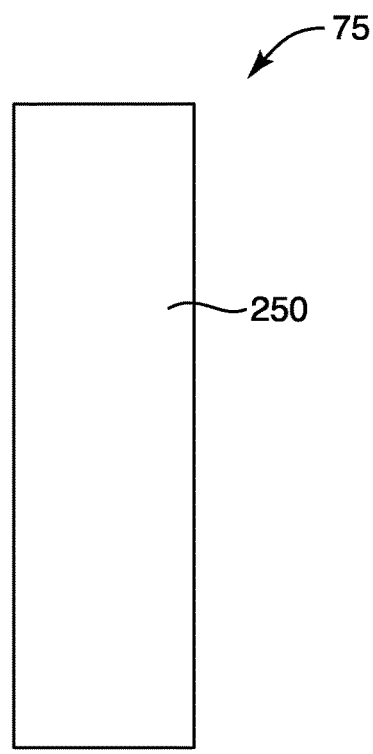
FIG. 7C illustrates a side view of the side reflector, in accordance with a representative embodiment.
Figure 8A:
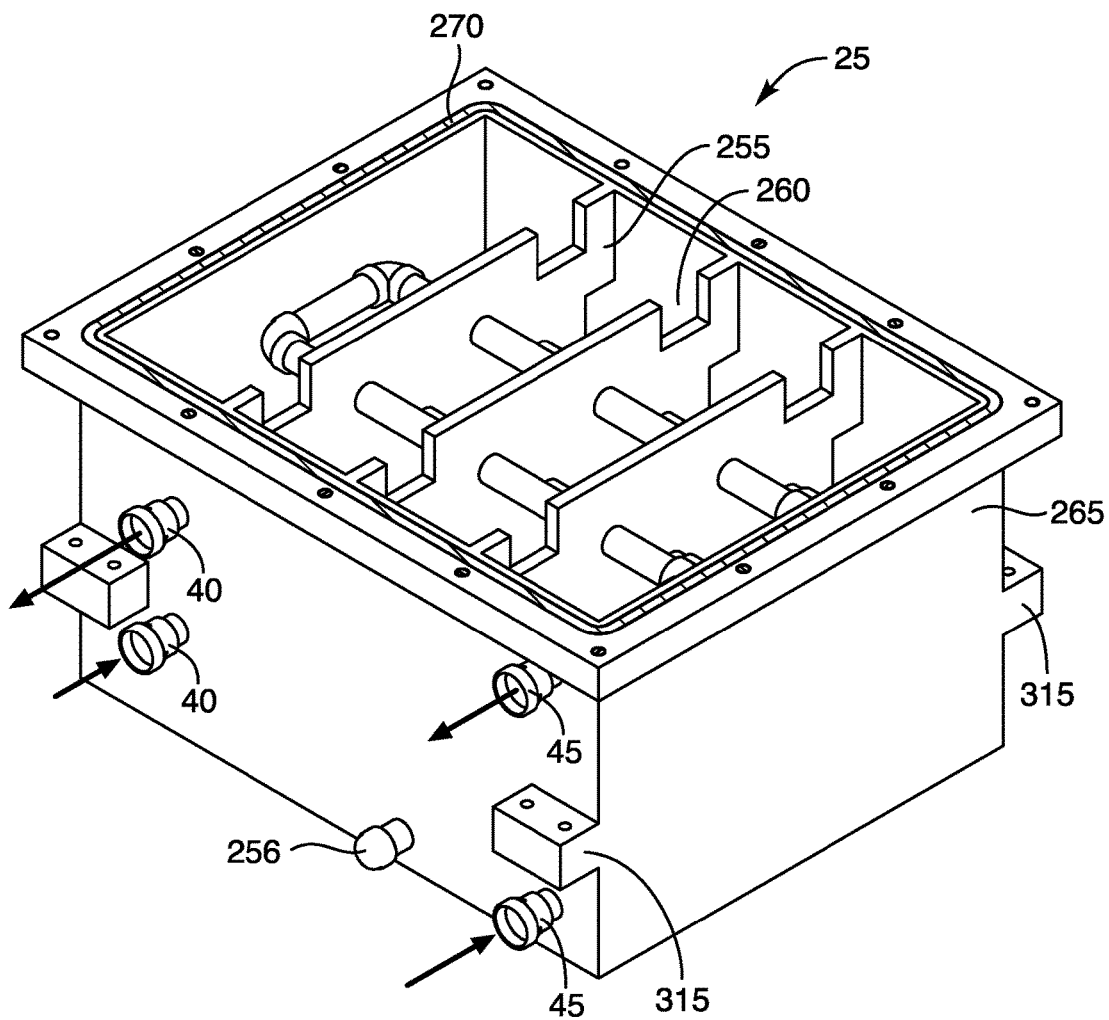
FIG. 8A illustrates a prospective view of a partially-assembled heat exchanger, in accordance with a representative embodiment.
Figure 8B:
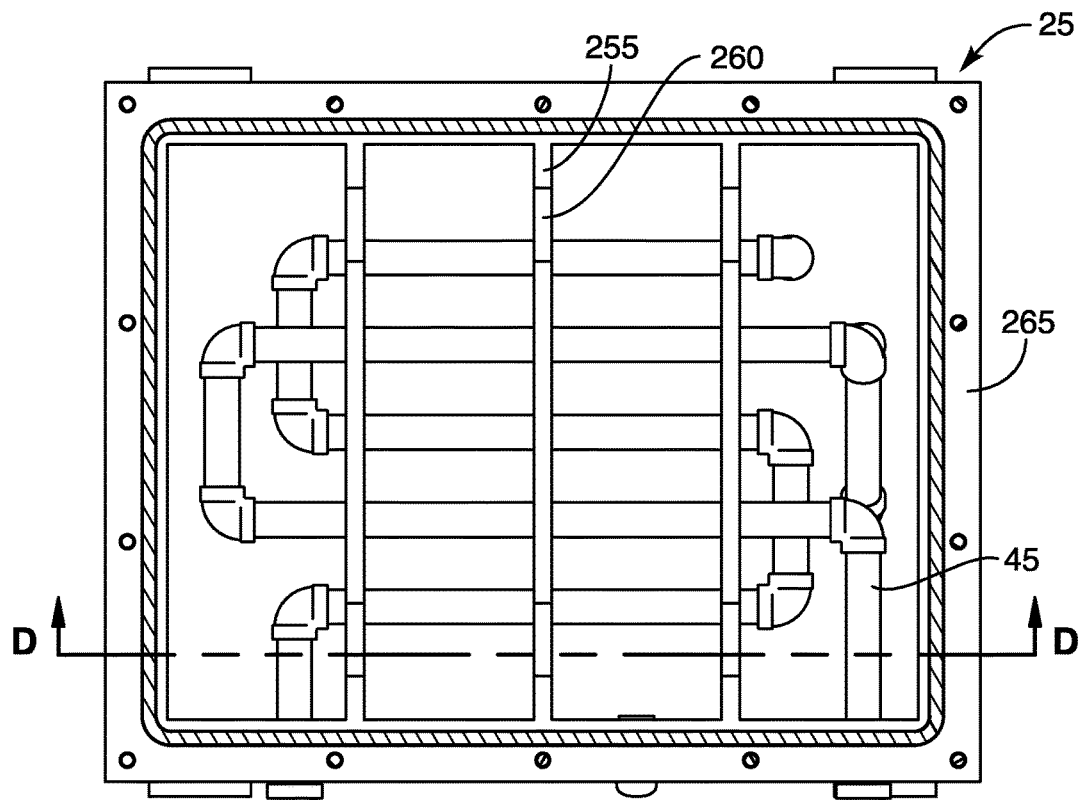
FIG. 8B illustrates a top view of the partially-assembled heat exchanger, in accordance with a representative embodiment.
Figure 8C:
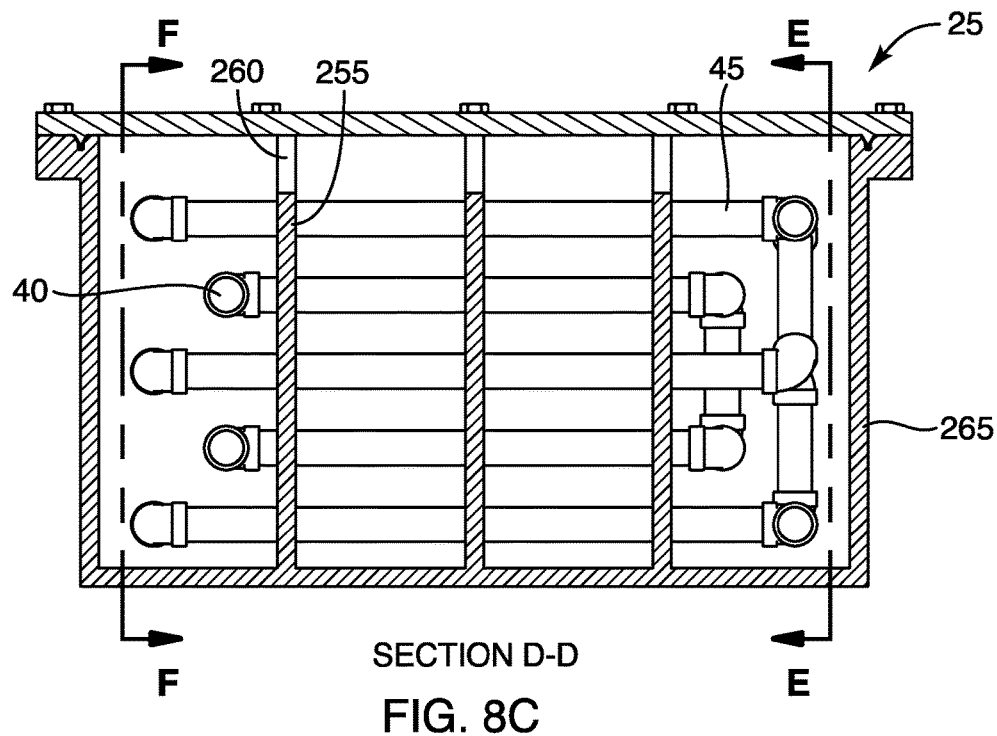
FIG. 8C illustrates a first cross-sectional view of the heat exchanger, in accordance with a representative embodiment.
Figure 8D:
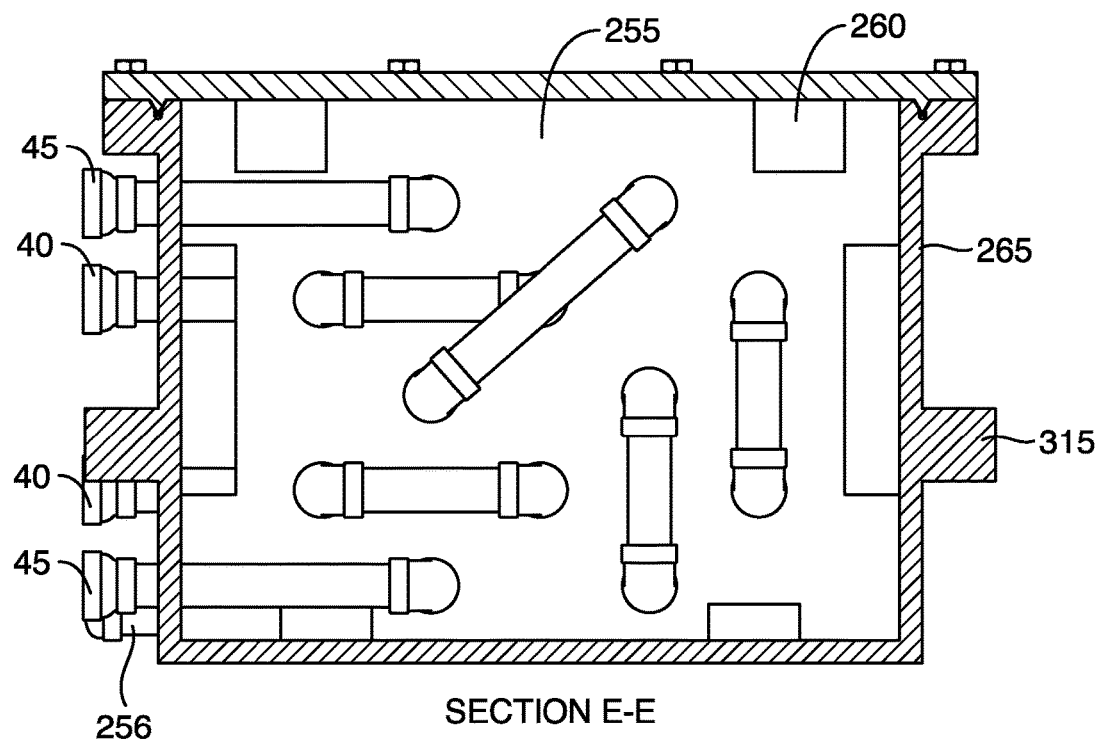
FIG. 8D illustrates a second cross-sectional view of the heat exchanger, in accordance with a representative embodiment.
Figure 8E:
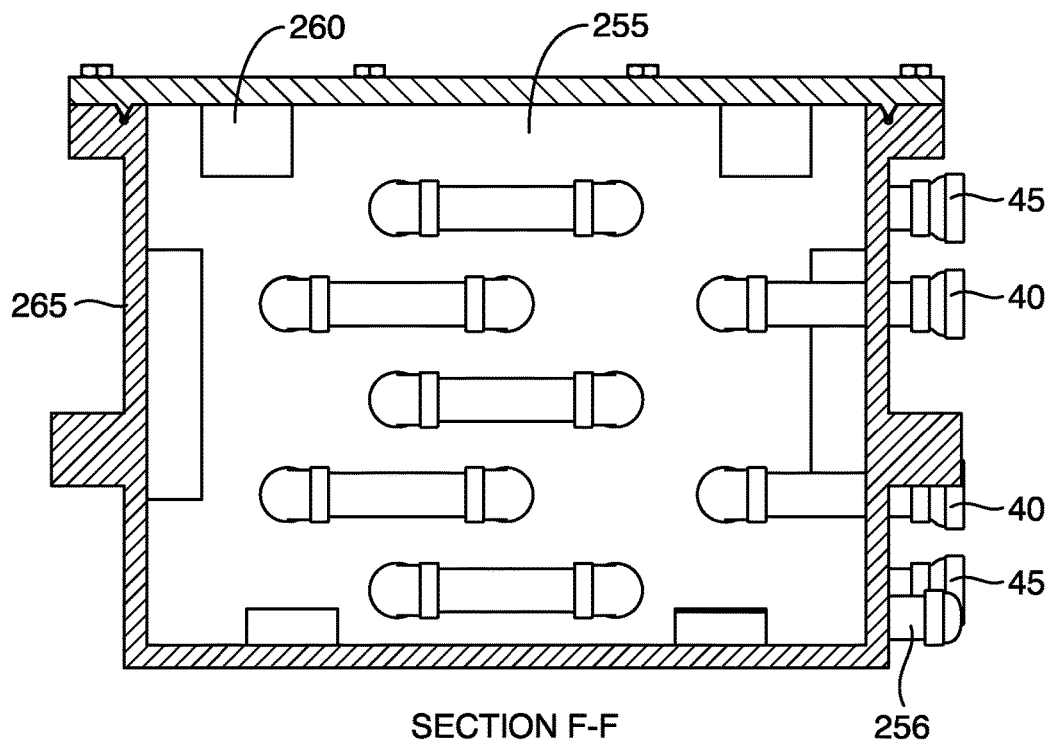
FIG. 8E illustrates a third cross-sectional view of the heat exchanger, in accordance with a representative embodiment.

With reference now to the reactor control mechanism 90, some embodiments of the described system 10 are configured to selectively modify the rate at which fuel flows through the reactor core 120. In this regard, in some cases and within some limits, as fuel is forced through the reactor core at higher and higher rates, the fuel is able to interact with the internal moderators to allow the fuel to reach higher and higher temperatures. Conversely, in some cases and within some limits, as the rate at which fuel flows through the reactor core is slowed, the temperature of the fuel also drops. Indeed, in some embodiments, if the fuel is allowed to stay stagnant in the reactor core for an extended period of time, the fuel will lose its critical state and will (if left long enough) even harden. Thus, by varying the rate at which fuel moves through the reactor core, the described system can vary the amount of heat (and hence the amount of electricity)

that the system produces. Moreover, by stopping the flow of fuel through the core, the system can be permanently and/or temporarily shut down.

Where the described system 10 comprises one or more mechanisms for varying the rate at which fuel flows through the reactor core 20, the reactor control mechanisms 90 can comprise any suitable component or mechanism that is capable of performing such a function. In this regard, some non-limiting examples of suitable reactor control mechanisms include one or more variable frequency fuel pumps, valves, mechanisms in which the reactor core is rotatable so as to move the fuel ports 150 and the corresponding fuel inlet 80 and outlet 85 into and out of alignment with each other, and/or any other suitable mechanism. Indeed, in at least some embodiments, the reactor core is configured to be rotated to increase and/or decrease the rate at which fuel passes through the reactor 20.

Where the reactor core 70 is configured to rotate to vary the rate at which fuel passes through the reactor, the reactor core can be rotated in any suitable manner that allows a passage between the fuel inlet 80 and/or outlet 85 and a corresponding fuel port 150 (e.g., in the first 140 and/or second 145 end cap) to become more and/or less occluded as the reactor core rotates. Indeed, in some embodiments, the reactor core is configured to be rotated manually, via one or more motors, servos, actuators, gear drives, worm drives, kelley drives, and/or other suitable mechanisms. In this regard, FIGS. 2A, 4L, and 4M show some embodiments in which the reactor core 70 is coupled with a partial gear 220 (or a sector gear) that is intermeshed with a second gear 225 that is sealed within the housing 65 and that comprises a pinion, gear, and/or other contact surface 230, which can be used to turn the second gear (e.g., via a wrench, pry bar, motor, servo, pneumatic driver, kelley shaft, and/or other suitable mechanism) to rotate the reactor core, to thereby vary the rate at which fuel is moved through the reactor and, hence, the amount of energy that is produced by the system 10. Additionally, FIGS. 4M and 6A-6D show that in some embodiments, at least one reflector 75 (e.g., the second reflector 240, as discussed below) is configured to allow the partial gear 220 and, hence, the reactor core 70 to rotate clockwise and counterclockwise. While this ability to rotate the reactor core in two directions may serve many purposes, in some embodiments, it allows the reactor core to move back and forth to break any fuel that has solidified and become crusted between the core and a reflector.

Turning now to the reflectors 75, some embodiments of the described reactor 20 comprise one or more reflectors that are configured to reflect neutrons and/or gamma rays released from the fuel as the fuel moves through the reactor core 70. As a result, the reflectors may help the reactor bring and/or maintain the fuel at a critical state, while (in some embodiments) preventing radiation from escaping from the reactor 20 and harming individuals in proximity to the reactor. In this regard, the reflectors can comprise any suitable characteristic that allows them to function as intended.

In one example of a suitable characteristic of the reflectors 75, the reflectors can be any suitable thickness that allows them to function as described herein. Indeed, in at least some embodiments, the reflectors ensure that an outer surface of the reactor core tube 120 and/or either of the end caps 140 or 145 is separated from an internal wall of the housing 65 by between about 2 cm and about 100 cm (or any subrange thereof) of a suitable material (e.g., graphite, as discussed below). Indeed, in some embodiments, the reflectors ensure that an outer surface of the reactor core tube 120 and/or either of the end caps 140 or 145 is separated from an internal wall of the housing 65 by between about 20 cm and about 600 cm (e.g., about 40 cm±10 cm) of reflector material. More specifically, in some embodiments, the reflectors ensure that an outer surface of the reactor core tube and/or either of the end caps is separated from an internal wall of the housing by at least about 30 cm.

As another example of a suitable characteristic of the reflectors 75, although some embodiments of the reactor core 70 are permanently enveloped in a reflector, in other embodiments, the reactor core is surrounded in the reactor housing 65 by one or more reflectors that are configured to be selectively removed and replaced. As a result, in some embodiments, if the reactor core, an internal moderator, a reflector, and/or another portion of the reactor 20 breaks, cracks, ages, and/or otherwise becomes damaged, one or more reflectors can be removed such that the damaged portion of the reactor can be removed, accessed, repaired, and/or replaced. In this regard, while the reflectors can be assembled in any suitable manner that allows them to surround the reactor core, FIGS. 4M, 5A-7C, and FIGS. 2A-2B show that, in some embodiments, the reflectors 75 comprise a first 235 and second 240 reflector that are configured to fit together to encase the reactor core 70 (e.g., as a clam shell), with a third 245 and fourth 250 reflector that each flank the first end cap 140 and the second end cap 145. Accordingly, in such embodiments, one or more reflectors can be removed and/or replaced relatively easily.

The various components of the reactor core 70 (including, without limitation, the reactor core itself, the reactor core tube 120, the first 140 and second 145 end caps, the cylindrical insert 156, the fuel pins 160, the fuel wedges 180, the diffusers 205, the reflectors 75, and/or the partial gear 220) can be made of any suitable materials. Some non-limiting examples of such materials include, but are not limited to, graphite (e.g., a substantially pure graphite having a purity level of about 99% or greater (such as a graphite purity of at least about 99.9%), a boron-free graphite, a pyrolytic graphite, a CGB grade graphite, and/or any other suitable graphite), and/or any other suitable material. Indeed, in some embodiments, the reactor core, the reactor core tube, the end caps, the cylindrical insert, the fuel pins, the fuel wedges, the diffusers, the reflectors, and/or the partial gear each comprise a 99.9% pure, boron-free graphite. In some other embodiments, one or more portions of the reactor core comprise one or more other metals, cements, ceramics, graphite spheres, and/or other suitable materials. For instance, some embodiments of the partial gear comprise a metal (e.g., HASTELLOY-N™ alloy) that is placed on and/or used to form teeth on the gear.

Turning now to the drains 95, some embodiments of the reactor 20 comprise one or more drains that are configured to drain (e.g., into a suitable holding tank) fuel that seeps from the reactor core 70, and/or that is released when (or if) the reactor core cracks and/or breaks. While such drains can comprise any suitable component that allows them to function as intended, in some embodiments, the drains comprise one or more ball valves, butterfly valves, gate valves, diaphragm valves, and/or other suitable valves comprising one or more suitable ceramic materials, metals, alloys, composites, and/or other suitable materials. Indeed, in some embodiments, the drain 95 (as shown in FIGS. 1B-2B) comprises a ceramic ball valve.

With reference now to the heat exchanger 25, in some embodiments of the described system 10, fuel that is brought to the critical state in the reactor core 70 is pumped (or otherwise moved) through the first fluid line 40 (which can be any suitable size and length), from the reactor 20, through the heat exchanger 25, and then back into the reactor for reheating. In some such embodiments, the heat exchanger is configured in such a manner that heat from fuel in the first fluid line is passed to a heat transfer medium running through the second fluid line (which can also be any suitable size and length). Accordingly, the described system can heat the heat transfer medium without ever contaminating it with radioactive materials from the fuel.

While the transfer of heat from the first line 40 to the second line 45 can be done in any suitable manner, in some embodiments, the first fluid line is disposed in proximity to the second fluid line (e.g., as shown in FIGS. 8A-8E). Additionally, in some embodiments, in order to better pass heat from the first fluid line to the second fluid line, both lines are at least partially submerged in and/or are otherwise surrounded by the heat transfer medium. Moreover, while the first and second fluid lines can run through the heat exchanger 25 in any suitable manner (by having one run in a top portion of the heat exchanger while the other line runs in the bottom portion, by having portions of the lines disposed in close proximity to each other, etc.), in some embodiments, a portion of the first fluid line is configured to be disposed in a bottom portion of the heat exchanger while a portion of the second fluid line is configured to be disposed in an upper portion of the heat exchanger.

With regards to the heat transfer medium, the heat transfer medium can comprise any suitable material or materials that allow it to safely absorb heat from the first fluid line 40 and, in some embodiments, to flow through the second fluid line 45. Some non-limiting examples of suitable heat transfer mediums include one or more salts that are free from fissionable materials, water, coolants, graphite gels, and/or other suitable materials. Indeed, in some embodiments, the heat transfer medium comprises one or more salts, which may include, but are not limited to, potassium nitrate; sodium nitrate; lithium fluoride; beryllium fluoride; a mixture of lithium fluoride and beryllium fluoride; a metal salt mixture of lithium fluoride, sodium fluoride, and potassium fluoride; a thermal graphite gel; and/or any other suitable salt or salts. Indeed, in some embodiments, the heat transfer medium comprises potassium nitrate and/or sodium nitrate. In some other embodiments, the carrier medium comprises potassium fluoride, sodium fluoride, and/or a graphite gel.

Where the heat transfer medium comprises more than one ingredient, the various ingredients can be present at any suitable concentration in the fuel. Indeed, in some embodiments, the two components are respectively used at a molar ratio between about 100:1 and 1:100, or at any suitable subrange thereof. In this regard, in some embodiments, the carrier medium respectively comprises potassium nitrate and sodium nitrate at a molar ratio between about 6:1 and about 0.5:1 (e.g., at a ratio of about 1.5:1). In other embodiments, however, the carrier medium comprises potassium nitrate and sodium nitrate at any molar ratio that is suitable for a desired energy output, thermal fluid, system, and/or other suitable factor.

The first 40 and second 45 fluid lines can be made of any suitable materials (e.g., one or more nickel alloys, low-chromium nickel-molybdenum alloys (such as HASTELLOY-N™), metals, cements, ceramics, synthetic materials, composites, and/or any other suitable materials) that allow the lines to function as intended. In some embodiments, however, the lines each comprise a low-chromium nickel-molybdenum alloy.

In addition to the aforementioned characteristics, the heat exchanger 25 can comprise any other suitable component, including, without limitation, a housing (e.g., a housing comprising one or more of the materials and components similar to those discussed above with respect to the reactor 20), one or more drains (e.g., drains comprising one or more of the materials and characteristics similar to those discussed above with respect to the drain 95), one or more baffles and/or supports, mixers (e.g., as discussed above with respect to the heater 15), pumps, seals (e.g., as discussed above with respect to the reactor), and/or other suitable components. By way of non-limiting illustration, FIGS. 8A-8E show some embodiments in which the heat exchanger 25 comprises one or more supports 255 with openings 260, drain 256, housings 265, and seals 270.

With reference now to the steam generator 30, in some optional embodiments, once the fuel (which has been brought to a critical state by passing through the reactor core 70) heats the heat transfer medium in the second fluid line 45 of the heat exchanger 25, the heated heat transfer medium is circulated (e.g., via one or more pumps or otherwise) in the second line from the heat exchanger to the steam generator, and then back to the heat exchanger. In some such embodiments, the second line (and/or an object heated thereby) is brought into contact and/or close proximity with water, such that heat from the heat transfer medium in the second line is able to convert the water to steam, which can then be used to turn a turbine connected to an electric generator 35 (which may include any suitable turbine and/or generator).

In addition to the aforementioned components, the steam generator 30 can comprise any other suitable component that allows it to function as intended. Indeed, in some embodiments, the steam generator comprises a housing (e.g., a housing comprising one or more of the materials and components similar to those discussed above with respect to the reactor 20), one or more drains (e.g., drains comprising one or more of the materials and characteristics similar to those discussed above with respect to the emergency drain 95), one or more baffles and/or supports, mixers (e.g., as discussed above with respect to the heater 15), pumps, seals (e.g., as discussed above with respect to the reactor), water inlets, steam outlets, and/or other suitable components. By way of non-limiting illustration, FIGS. 9A-9E show some embodiments in which the steam generator 30 comprises one or more supports 280 with openings 285, drain 290, housings 295, seals 300, water inlets 305, and steam outlets 310.

The various portions of the described system 10 can be made in any suitable manner. In this regard, some non-limiting examples of methods for making the described reactor core 70 include boring, machining, etching, cutting, drilling, grinding, shaping, plaining, molding, extruding, sanding, lathing, smoothing, buffing, polishing, and/or otherwise forming various pieces of graphite (and/or another suitable material) to form one or more pieces of the reactor core (e.g., the reactor core tube 120, end caps 140 and 145, fuel pins, 160, fuel wedges 180, diffusers, 205, reflectors 75, and/or other suitable parts). Furthermore, the other portions of the described system can be formed in any suitable manner, including, without limitation, via cutting; bending; tapping; dying; sanding; plaining; shaping; molding; extruding; drilling; grinding; buffing; polishing; connecting various pieces with one or more adhesives, mechanical fasteners (e.g., nails, clamps, rivets, staples, clips, pegs, crimps, pins, brads, threads, brackets, etc.), welds, and/or by melting pieces together; and/or any other suitable method that allows the described system to perform its intended functions.

In addition to the aforementioned features, the described system 10 can be modified in any suitable manner that allows the system to generate heat and/or electricity. In one example, the various components of the described system can be coupled together in any suitable manner (e.g., via the first fluid line 40, the second fluid line 45, one or more connectors, ball valves, valves, and/or in any other suitable manner). By way of non-limiting illustration, FIG. 1B shows an embodiment in which the reactor 20 is coupled to the heat generator 25, which (in turn) is coupled to the steam generator, via one or more connection points 315 (e.g., lugs, recesses, mechanical fasteners, hammer pin rocks, catches, etc.) and connectors 320 (e.g., brackets, catches, braces, couplers, ball connections, joints, etc.).

In another example, one or more components of the described system 10 are coupled to a common object. In this regard, some examples of such objects include, but are not limited to, a trailer (e.g., for a truck), a skid, a platform, a pallet, a train car, a vehicle (e.g., a train, car, truck, tractor, boat, ship, submarine, submergible, airplane, hovercraft, trolley, tank, motorcycle, bus, transports, heavy machinery, machinery, motor home, van, helicopter, military vehicle, space shuttle, drone, UAV, etc.); and/or any other suitable object.

In another example, some embodiments of the reactor core 70 comprise one or more fuel pins 160 having rounded ends with a fuel channel 155 running between the two ends. In such embodiments, the pins can have any suitable characteristics that allows the reactor core to bring the fuel to (or to maintain the fuel at) a critical state. Indeed, in some embodiments, the rounded ends comprise one or more threads or other connection mechanisms configured to attach the rounded ends to the pin.

Figure 9A:
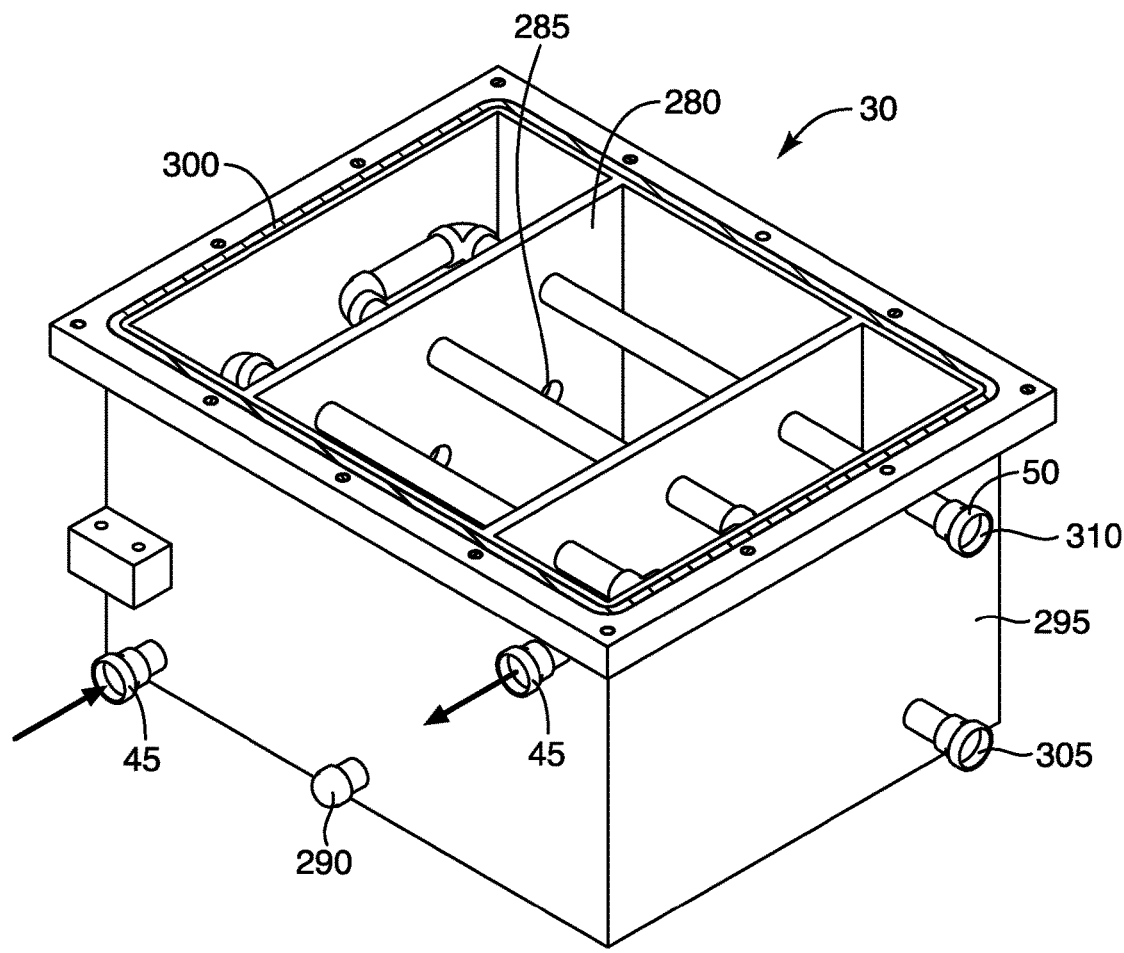
FIG. 9A illustrates a prospective view of a partially-assembled steam generator, in accordance with a representative embodiment.
Figure 9B:
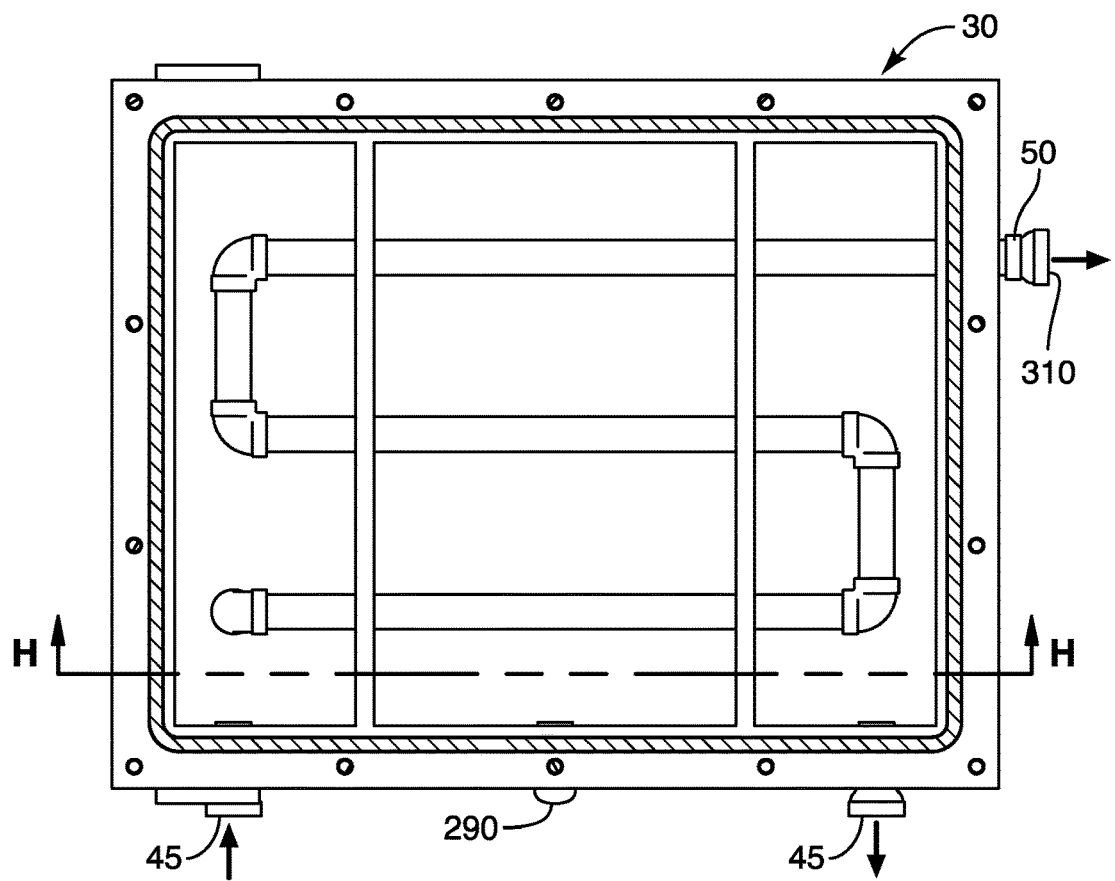
FIG. 9B illustrates a top view of the partially-assembled steam generator, in accordance with a representative embodiment.
Figure 9C:
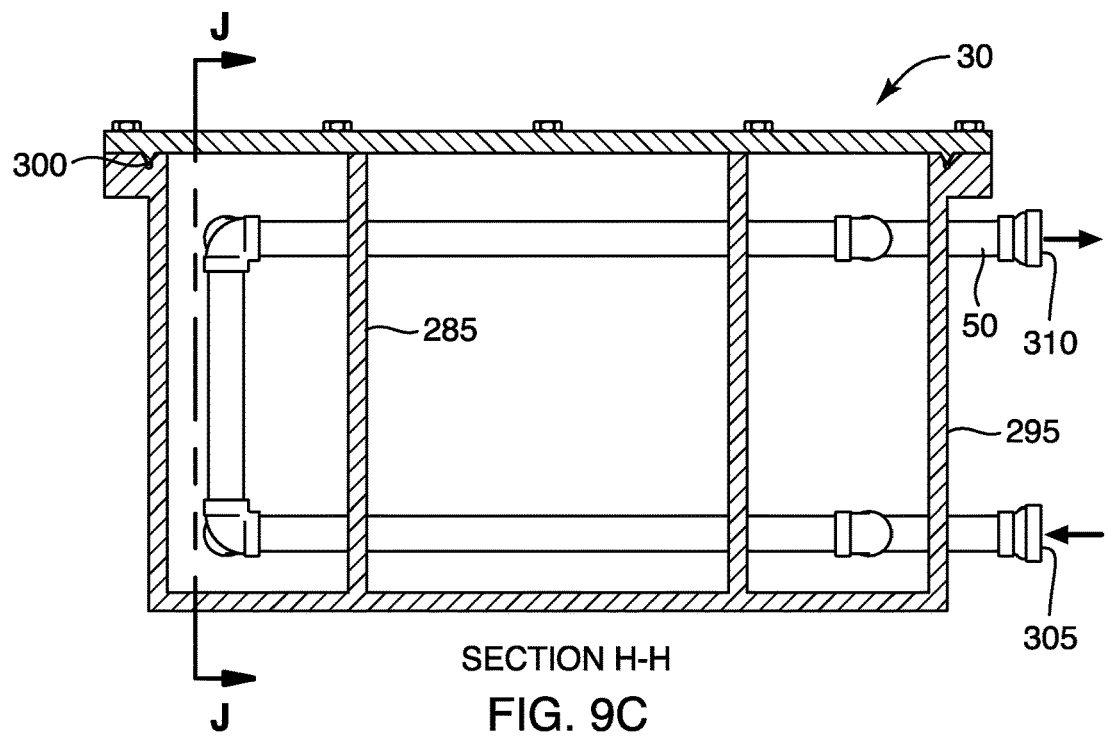
FIG. 9C illustrates a first cross-sectional view of the steam generator, in accordance with a representative embodiment.
Figure 9D:
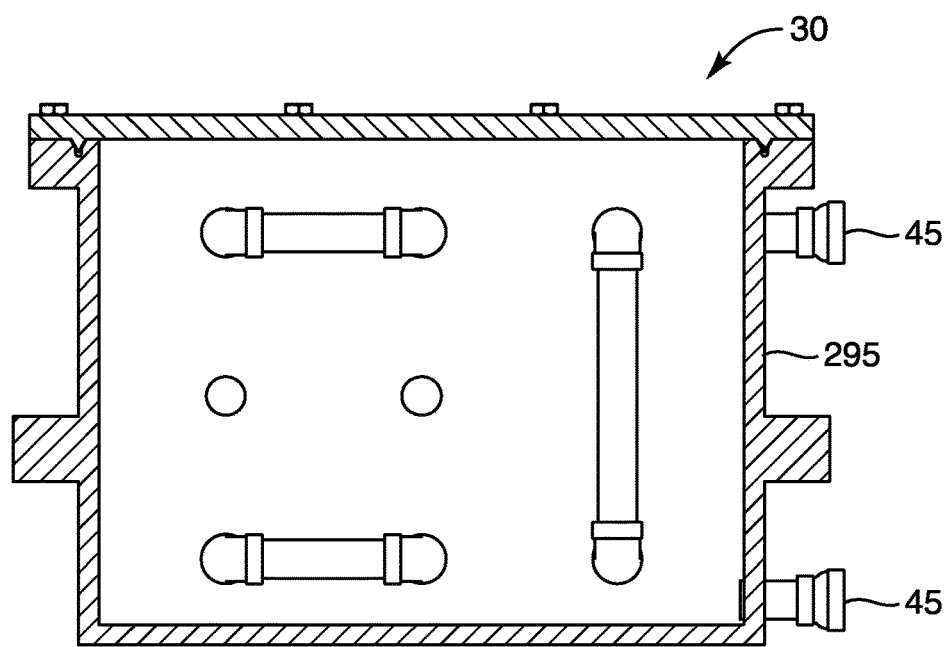
FIG. 9D illustrates a second cross-sectional view of the steam generator, in accordance with a representative embodiment.
Figure 9E:
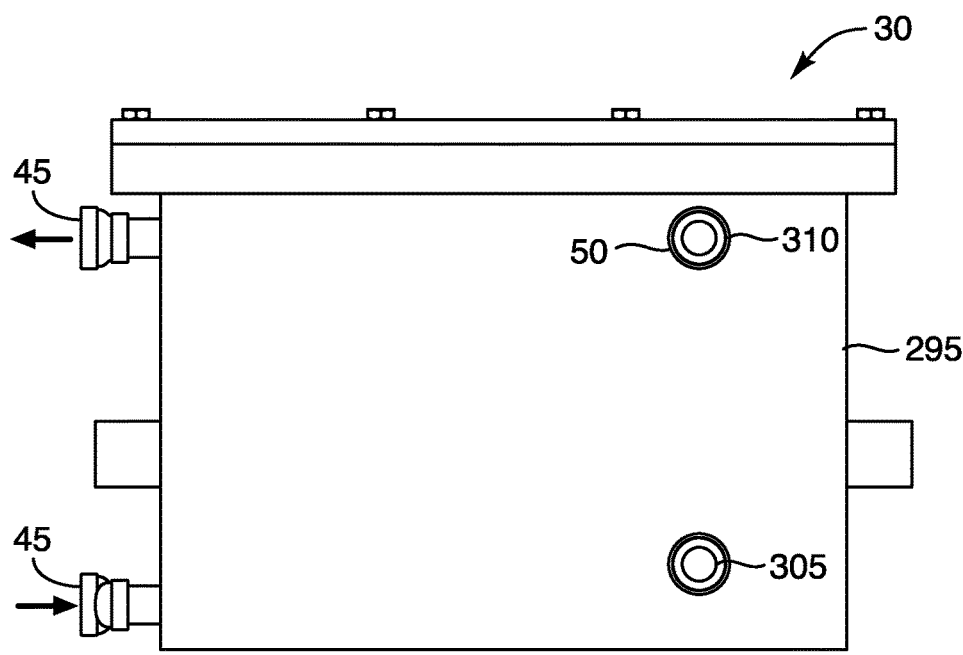
FIG. 9E illustrates a side view of the steam generator, in accordance with a representative embodiment.
Figure 9F:
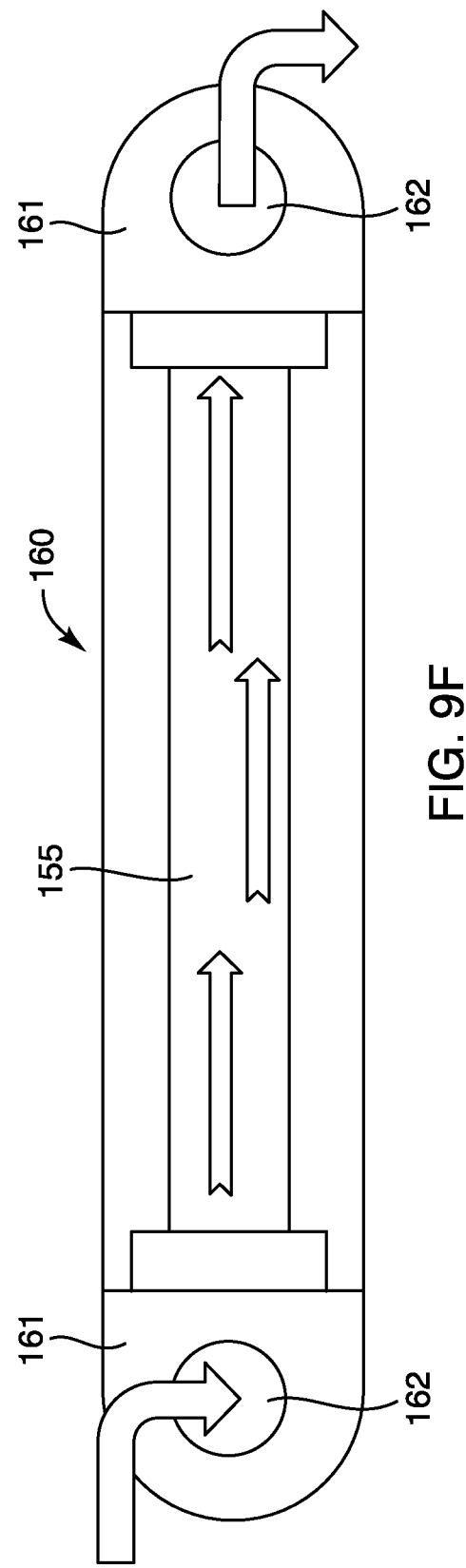
FIG. 9F illustrates a side view of a fuel pin, in accordance with a representative embodiment.

The rounded ends of the pins 160 can further comprise any suitable number of holes, of any suitable size, that are configured to direct fuel into (and/or out of) the fuel channel(s) running in the pin. Indeed, in some embodiments, each of the rounded ends comprise 1, 2, 3, 4, 5, or more openings. Moreover, while the openings in the rounded ends of the pin can extend in any suitable manner, in some embodiments, the openings are disposed at an angle that directs fuel from the openings to (and/or from) the fuel channel in the pin. Furthermore, in some embodiments, a cross-sectional area of all of the openings in a rounded end of a pin are between about 80% and about 120% (or any subrange thereof) of a cross-sectional area of the fuel channel 155 in the pin. In one non-limiting illustration, FIG. 9F shows an embodiment in which a fuel pin 160 comprises two rounded ends 161 defining at least one opening 162, with a fuel channel 155 running through the pin.

In another example, instead of being configured to generate steam, which is then used to generate heat, in some embodiments, the heat exchanger 25 and/or the second fluid line 45 are configured to heat and expand air. In turn, such expanded air can be used to turn a turbine (or otherwise actuate another suitable device) and generate electricity.

In yet another example, instead of generating steam, the heat exchanger 25 and/or the second fluid line 45 are used to heat any other suitable object and/or medium. Indeed, in some embodiments, the heat exchanger and/or second fluid line are used to heat: a body of water (e.g., for distillation, desalination, evaporation, aquaculture, and/or any other suitable purpose), a building, a stadium, a neighborhood, an area, air, a complex, an underground reservoir containing fossil fuels, a heat transfer fluid, tar sands, oil shale, a biofuel waste water treatment plant, and/or any other suitable object and/or material.

In still another example, instead of having the heat exchanger 25 and the steam generator 30 comprise two discrete components that are disposed next to each other, in some embodiments, one is contained (at least partially) within the other. Indeed, in some embodiments, at least a portion of the heat exchanger is disposed within the steam generator.

In another example of a manner in which the described system 10 can be modified, in some embodiments, the rate at which fuel is passed through the reactor core 70 is controlled by a computer processor (e.g., as discussed below in the Representative Operating Environment system). Accordingly, in some embodiments, a computer (e.g., a special-purpose computer that is configured to regulate the reactor and/or a general purpose computer configured to perform the same function) is configured to increase the flow of fuel through the reactor core when more energy is needed (e.g., during peak hours of electrical consumption), to slow the flow of fuel through the reactor core when less energy is needed (e.g., during off-peak hours), and/or to shut down the reactor 20 when desired (e.g., in case of an emergency, maintenance, etc.).

In yet another example, some embodiments of the described reactor 20 comprise one or more bearings and/or low friction surfaces that help allow for the reactor core 70 to rotate with respect to one or more reflectors 75.

In even another example of a suitable modification, some embodiments of the described system 10 comprise one or more condensers that are configured to recycle some or all of the steam produced by the steam generator 30.

Figure 10:
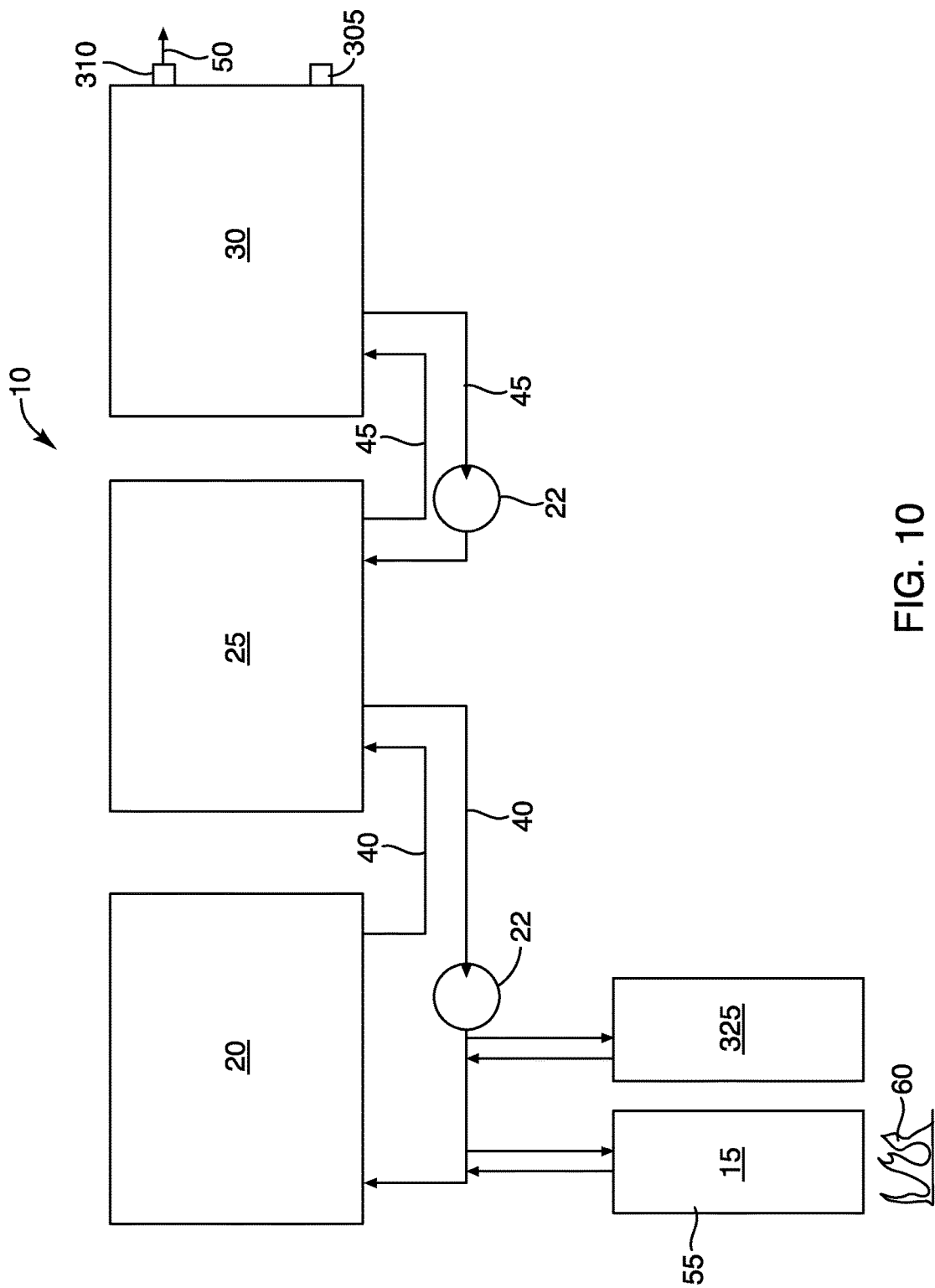
FIG. 10 illustrates a schematic of the molten salt reactor system, in accordance with a representative embodiment of the invention.

In still another example of a suitable modification, some embodiments of the described system 10 are configured to extract one or more materials (e.g., chemicals, composition, mixtures, gases, and/or other desired materials) from the fuel as it cycles through the system. Indeed, in some embodiments (as illustrated by FIG. 10) the described system 10 comprises a processing center 325 that is configured to remove isotopes (e.g., medical grade isotopes) and/or other materials that are generated as the fuel is cycled.

In another example, the described system 10 can comprise any other suitable component, including, without limitation, a secondary containment structure; a tertiary containment structure; a radiator configured to dissipate heat from the reactor core and/or fuel; one or more dump tanks configured to receive the fuel and/or heat transfer medium; one or more additional reactors 20 used in parallel, series, and/or any other suitable manner with the first reactor core 70; one or more emergency programs that are configured to automatically slow and/or stop the flow of fuel through the reactor core; one or more other components and/or programs that are configured to shut in and/or to dump the fuel from the reactor core 20; and/or any other suitable component.

In addition to the aforementioned features, the described system 10 can comprise any other suitable feature. Indeed, some embodiments of the described reactor core 70 are configured to be used in any orientation, including, without limitation, in a horizontal, vertical, diagonal, and/or variable orientation. Indeed, unlike some reactors, some embodiments of the described reactor core are configured to be used in a horizontal orientation (e.g., as shown in FIG. 1C). Additionally, in some embodiments, the reactor core is configured to function as its orientation is changed (e.g., from vertical orientation, to diagonal orientation, and/or to a vertical orientation. Accordingly, some embodiments of the described reactor core are well suited for submarines, aircraft, and/or other moving objects which may slightly or significantly vary the orientation of the reactor core.

As another example of a feature of the described system 10, some embodiments of the system are configured to drain out some or all of the fuel in the reactor core 70 to shut down the reactor 20. Indeed, in some embodiments, the system is configured to allow a significant portion of the fuel to be drained from the reactor core (e.g., via the fuel outlet 85) such that the remaining fuel in the reactor cools down and solidifies. In some such embodiments, the reactor can be restarted by cracking the fuel (e.g., via the heater 15), introducing the cracked fuel into the reactor, and then recirculating the cracked fuel until the solidified fuel in the core is heated and brought to a critical state.

As still another example, unlike some nuclear power plants that require a relatively large amount of real estate, some embodiments of the described system 10 have a relatively small footprint. Indeed, as discussed above, some embodiments of the described system can fit on a trailer, a train car, and/or in a variety of other locations that are relatively small.

In still another example, some embodiments of the described system 10 are configured to actually use or "burn" nuclear waste from other nuclear reactors. As a result, in some embodiments, the described systems are quite beneficial for the environment and relatively inexpensive to operate.

In still another example of a feature of the described system 10, in some embodiments, as the various components of the fuel are mixed, such components become polluted from their pure state—thus making them relatively undesirable to terrorists or others who may seek to create weapons from such materials.

In still another example, some embodiments of the described system 10 are configured to produce relatively small amounts of plutonium in comparison to other nuclear power plants.

In yet other examples of features associated with the described system, the reactor 20, in some embodiments of the described system, is configured to be air cooled, and to thus require rather small amounts of water when compared with some conventional nuclear power reactors.

In even another example of a feature, some embodiments of the described system 10 comprise a reactor core 70 that has an internal space 135 that is relatively full with internal moderators. In this regard, some such embodiments leave relatively little room for gas (e.g., hydrogen, and/or other gases) to build-up in the reactor core 70. As a result, in some embodiments, some gases are prevented from forming and/or some gases are readily purged from reactor core, thus reducing the chances of unwanted chemical reactions and/or explosions.

In yet another example, some embodiments of the described system are readily made mobile, thus making them ideal for power generation in locations with relatively little infrastructure (e.g., at oil drilling sites, offshore oil drilling platforms, off-planet locations, the theater of war, etc.).

Representative Operating Environment

As mentioned, some embodiments of the described system 10 are configured to be operated (at least in part) by one or more special-purpose computers (e.g., computers configured to control the reactor core 70) and/or general purpose computers. Indeed, the described systems and methods can be used with or in any suitable operating environment and/or software. In this regard, FIG. 11 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 11:
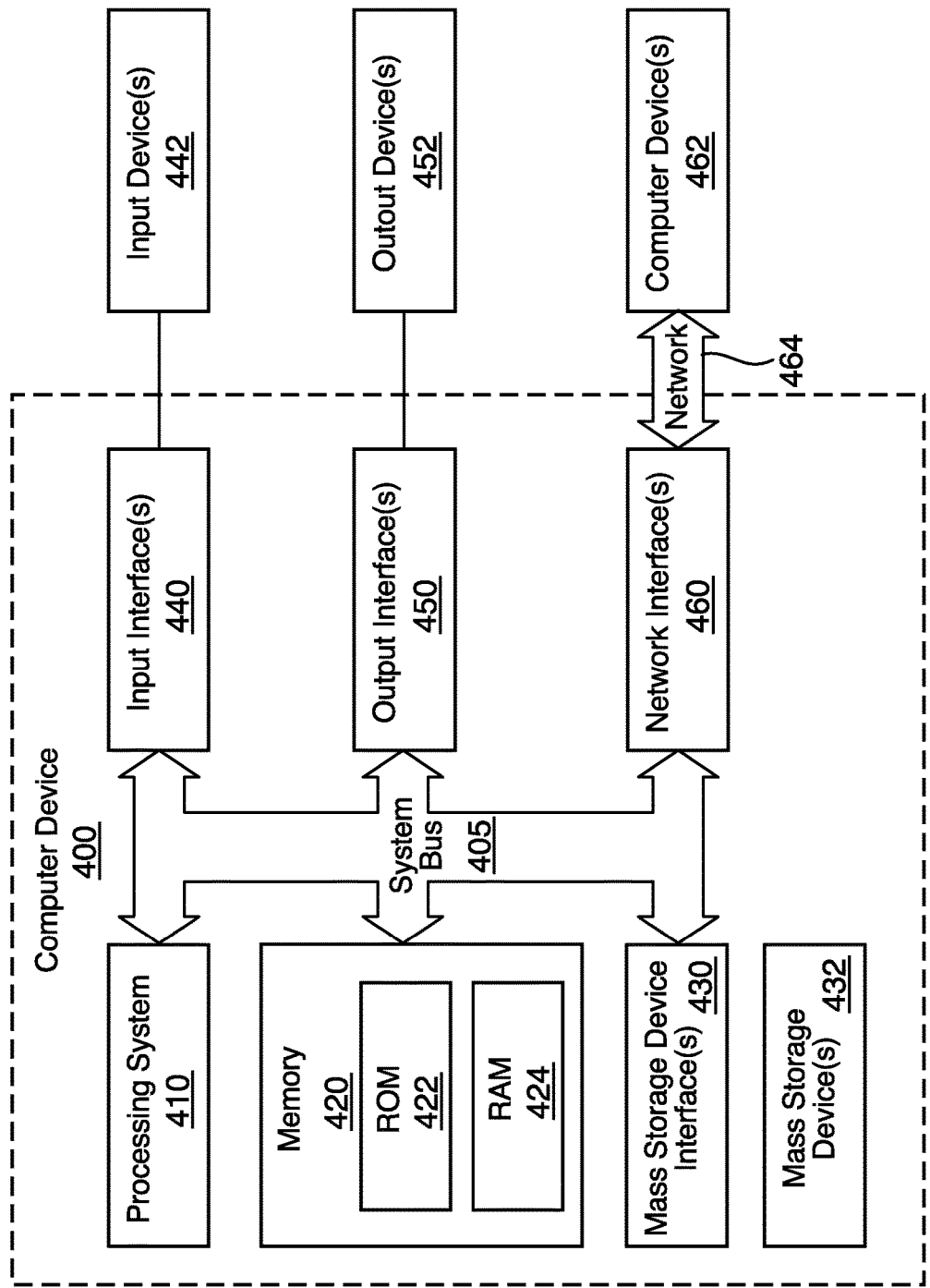
FIG. 11 illustrates a representative system that provides a suitable operating environment for use with some embodiments of the molten salt reactor system.

With reference to FIG. 11, a representative system includes computer device 400 (e.g., a digital ratings device or other unit), which may be a general-purpose or (in accordance with some presently preferred embodiments) special-purpose computer. For example, computer device 400 may be a personal computer, a notebook computer, a PDA or other hand-held device, a workstation, a digital pen, a digital ratings device, a digital ratings device dock, a digital ratings device controller, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 400 includes system bus 405, which may be configured to connect various components thereof and enables data to be exchanged between two or more components. System bus 405 may include one of a variety of bus structures including a memory bus or memory controller, a peripheral bus, or a local bus that uses any of a variety of bus architectures. Typical components connected by system bus 405 include processing system 410 and memory 420. Other components may include one or more mass storage device interfaces 430, input interfaces 440, output interfaces 450, and/or network interfaces 460, each of which will be discussed below.

Processing system 410 includes one or more processors, such as a central processor and optionally one or more other processors designed to perform a particular function or task. It is typically processing system 410 that executes the instructions provided on computer readable media, such as on the memory 420, a magnetic hard disk, a removable magnetic disk, a magnetic cassette, an optical disk, or from a communication connection, which may also be viewed as a computer readable medium.

Memory 420 includes one or more computer readable media (including, without limitation, non-transitory computer readable media) that may be configured to include or includes thereon data or instructions for manipulating data, and may be accessed by processing system 410 through system bus 405. Memory 420 may include, for example, ROM 422, used to permanently store information, and/or RAM 424, used to temporarily store information. ROM 422 may include a basic input/output system ("BIOS") having one or more routines that are used to establish communication, such as during start-up of computer device 400. RAM 424 may include one or more program modules, such as one or more operating systems, application programs, and/or program data.

One or more mass storage device interfaces 430 may be used to connect one or more mass storage devices 432 to the system bus 405. The mass storage devices 432 may be incorporated into or may be peripheral to the computer device 400 and allow the computer device 400 to retain large amounts of data. Optionally, one or more of the mass storage devices 432 may be removable from computer device 400. Examples of mass storage devices include hard disk drives, magnetic disk drives, tape drives, solid state mass storage, and optical disk drives.

Examples of solid state mass storage include flash cards and memory sticks. A mass storage device 432 may read from and/or write to a magnetic hard disk, a removable magnetic disk, a magnetic cassette, an optical disk, or another computer readable medium. Mass storage devices 432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 440 may be employed to enable a user to enter data (e.g., initial information) and/or instructions to computer device 400 through one or more corresponding input devices 442. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 440 that may be used to connect the input devices 442 to the system bus 405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 450 may be employed to connect one or more corresponding output devices 452 to system bus 405. Examples of output devices include a monitor or display screen, a speaker, a wireless transmitter, a printer, and the like. A particular output device 452 may be integrated with or peripheral to computer device 400. Examples of output interfaces include a video adapter, an audio adapter, a parallel port, and the like.

One or more network interfaces 460 enable computer device 400 to exchange information with one or more local or remote computer devices, illustrated as computer devices 462, via a network 464 that may include one or more hardwired and/or wireless links Examples of the network interfaces include a network adapter for connection to a local area network ("LAN") or a modem, a wireless link, or another adapter for connection to a wide area network ("WAN"), such as the Internet. The network interface 460 may be incorporated with or be peripheral to computer device 400.

Figure 12:
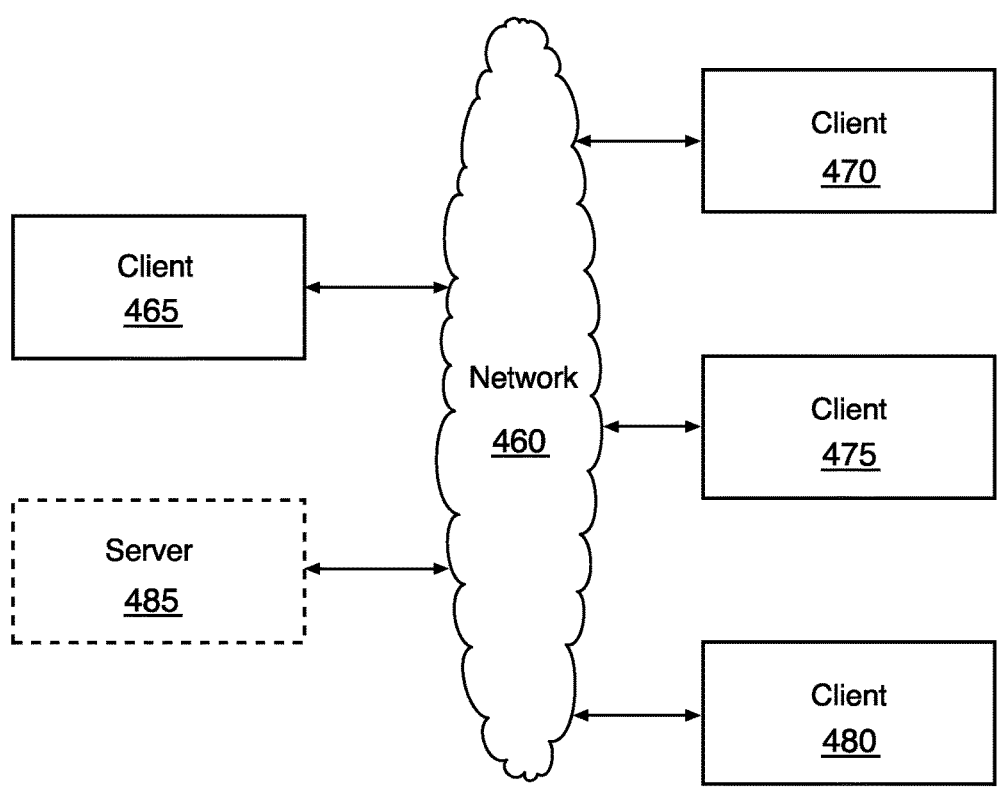
FIG. 12 illustrates a representative embodiment of a networked system that provides a suitable operating environment for use with some embodiments of the molten salt reactor system.

In a networked system, accessible program modules or portions thereof may be stored in a remote memory storage device. Furthermore, in a networked system computer device 400 may participate in a distributed computing environment, where functions or tasks are performed by a plurality networked computer devices. While those skilled in the art will appreciate that the described systems and methods may be practiced in networked computing environments with many types of computer system configurations, FIG. 12 represents an embodiment of a portion of the described systems in a networked environment that includes clients (465, 470, 475, etc.) connected to a server 485 via a network 460. While FIG. 12 illustrates an embodiment that includes 3 clients connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote monitoring, observation, adjusting, and other controlling of one or more of the described systems 10 from many places throughout the world.

Thus, as discussed herein, embodiments of the present invention embrace molten salt reactors. More particularly, some implementations of the described invention relate to systems and methods for providing a thorium molten salt reactor. In this regard, some implementations of the reactor are configured to rotate a reactor core to vary a flow rate of fissionable fuel through the reactor. Moreover, in some implementations, the reactor core houses two or more fuel wedges that each define at least one fuel channel that extends through the wedges. In some implementations, one or more of the wedges, components of the reactor core, and/or reflectors surrounding the core are configured to be replaced relatively easily.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A molten salt reactor, comprising:
   a reactor core comprising graphite, the reactor core defining an internal space;
   multiple fuel wedges that each define a fuel channel,
      wherein the fuel wedges are received within the internal space of the reactor core, and
      wherein the fuel channel is configured to allow a fissionable fuel to flow from a first end of each of the wedges to a second end of each of the wedges,
   wherein the reactor core is disposed within a reactor housing,
   wherein the reactor core comprises a fuel ingress port and a fuel egress port, and
   wherein the reactor core is configured to rotate within the housing such that the fuel ingress and egress ports become at least one or more occluded and less occluded as the reactor core rotates.

2. The reactor of claim 1, further comprising a fuel pin rod disposed between at least two of the fuel wedges.

3. The reactor of claim 1, wherein the reactor core comprises:
   a reactor core tube with a first opening and a second opening;
   a first reactor end cap that caps the first opening; and
   a second reactor cap that caps the second opening.

4. The reactor of claim 3, further comprising a diffuser that is disposed between a portion of the first reactor end cap and the internal space of the reactor core.

5. The reactor of claim 1, wherein at least one of the fuel wedges defines a standoff space that is disposed between the fuel channel and the first end of the at least one of the fuel wedges.

6. The reactor of claim 1, wherein the reactor core is rotatably received within a graphite reflector, and wherein the graphite reflector is disposed within a reactor housing.

7. The reactor of claim 1, wherein the reactor core and the fuel wedges are configured to allow the wedges to expand between about 0.5% and about 10% as the wedges are heated within the reactor core.

8. A molten salt reactor, comprising:
   a reactor core comprising graphite, the reactor core defining an internal space;
   multiple fuel wedges
      that are received within the internal space and
      that each define a fuel channel that is configured to allow a thorium molten salt fuel to flow from a first end to a second end of each of the wedges;
   a fuel pin rod that is disposed between at least two of the wedges,
      the fuel pin rod defining an internal fuel conduit; and
   a reactor housing,
   wherein the reactor core further comprises a fuel ingress port and a fuel egress port, and
   wherein the reactor core is rotatably received within the reactor housing such that the fuel ingress and egress ports are configured to become at least one of (i) more occluded and (ii) less occluded as the reactor core rotates within the housing.

9. The reactor of claim 8, wherein at least one of the fuel wedges defines a standoff space that is disposed between the fuel channel and the first end of the at least one of the fuel wedges.

10. The reactor of claim 8, wherein the reactor comprises a rotation gear that is coupled to the reactor core.

11. The reactor core of claim 8, wherein the reactor core comprises:
    a reactor core tube with a first terminal end and a second terminal end;
    a first reactor end cap that is disposed at the first terminal end and is sealed with the reactor core tube; and
    a second reactor cap that is disposed at the second terminal end and is sealed with the reactor core tube.

12. The reactor core of claim 8, wherein the reactor core further comprises a diffuser that is disposed between the fuel ingress port and the first end of the fuel wedges.

13. The reactor core of claim 8, further comprising a graphite reflector that is disposed within the reactor housing that rotatably receives the reactor core.

14. The reactor core of claim 8, wherein the fuel pin rod defines a standoff space that is disposed between a first terminal end of the fuel pin and the internal fuel conduit.

* * * * *